US010674215B2

(12) United States Patent
Sokolov et al.

(10) Patent No.: US 10,674,215 B2
(45) Date of Patent: Jun. 2, 2020

(54) METHOD AND SYSTEM FOR DETERMINING A RELEVANCY PARAMETER FOR CONTENT ITEM

(71) Applicant: YANDEX EUROPE AG, Lucerne (CH)

(72) Inventors: Yevgeny Andreevich Sokolov, Belaya Kalitva (RU); Victor Grigorievich Lamburt, Moscow (RU); Boris Dmitrievich Sharchilev, Moscow (RU); Andrey Petrovich Danilchenko, d Staraya (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 16/370,286

(22) Filed: Mar. 29, 2019

(65) Prior Publication Data

US 2020/0092611 A1   Mar. 19, 2020

(30) Foreign Application Priority Data

Sep. 14, 2018 (RU) .................................. 2018132716

(51) Int. Cl.
*H04N 21/466* (2011.01)
*G06N 20/00* (2019.01)
(Continued)

(52) U.S. Cl.
CPC ... *H04N 21/4668* (2013.01); *G06F 16/24578* (2019.01); *G06N 20/00* (2019.01); *H04N 21/4756* (2013.01)

(58) Field of Classification Search
None
See application file for complete search history.

(56) References Cited

U.S. PATENT DOCUMENTS 7,007,242 B2   2/2006   Suomela et al.
7,328,216 B2   2/2008   Hofmann et al.
(Continued)

FOREIGN PATENT DOCUMENTS

| CN | 103077220 A | 5/2013 |
| CN | 103167330 A | 6/2013 |

(Continued)

OTHER PUBLICATIONS

"Browser Amigo by Mail.ru", https://www.youtube.com/watch?v=9IPOwpplcWM accessed on Mar. 9, 2020; https://www.youtube.com/watch?v=vdxnXZT2tQo accessed on Mar. 9, 2020, pdf 7 pages.

(Continued)

*Primary Examiner* — Alexander Q Huerta
(74) *Attorney, Agent, or Firm* — BCF LLP

(57) ABSTRACT

A method of determining a relevancy parameter for a digital content item and a system for implementing the method. The digital content item is originated from a content channel associated with a recommendation system. The method is executable by the server. The method comprises: identifying a pool of users associated with the content channel, a given user of the pool of users being associated with the content channel. The method comprises using the pool of users to explore and predict a relevancy parameter. The relevancy parameter is then used for predicting relevancy parameter of the digital content item for a user outside of the pool of users based on the user interactions of the first user.

19 Claims, 5 Drawing Sheets

(51) Int. Cl.
*G06F 16/2457* (2019.01)
*H04N 21/475* (2011.01)

(56) References Cited

U.S. PATENT DOCUMENTS

| | | |
|---|---|---|
| 7,502,789 B2 | 3/2009 | Yao et al. |
| 7,540,051 B2 | 6/2009 | Gundersen et al. |
| D607,463 S | 1/2010 | Krieter et al. |
| 7,685,200 B2 | 3/2010 | Gunawardena et al. |
| D613,300 S | 4/2010 | Chaudhri |
| 7,849,076 B2 | 12/2010 | Zheng et al. |
| 8,010,527 B2 | 8/2011 | Denoue et al. |
| 8,244,740 B2 | 8/2012 | Gruenhagen et al. |
| 8,271,898 B1 | 9/2012 | Mattos et al. |
| 8,285,602 B1 | 10/2012 | Yi et al. |
| 8,290,818 B1 | 10/2012 | Levitan et al. |
| 8,301,623 B2 | 10/2012 | Chakrabarti et al. |
| 8,386,955 B1 | 2/2013 | Weber et al. |
| 8,412,726 B2 | 4/2013 | Yan et al. |
| 8,429,184 B2 | 4/2013 | Ismalon |
| D682,844 S | 5/2013 | Friedlander et al. |
| 8,478,664 B1 | 7/2013 | Xavier et al. |
| 8,478,750 B2 | 7/2013 | Rao et al. |
| 8,510,252 B1 | 8/2013 | Gargi et al. |
| D691,619 S | 10/2013 | Satterfield et al. |
| D693,833 S | 11/2013 | Inose et al. |
| 8,600,968 B2 | 12/2013 | Holenstein et al. |
| 8,606,792 B1 | 12/2013 | Jackson et al. |
| 8,676,736 B2 | 3/2014 | Pilaszy et al. |
| 8,683,374 B2 | 3/2014 | Vaughan et al. |
| 8,712,937 B1 | 4/2014 | Bacus et al. |
| 8,751,507 B2 | 6/2014 | Kim et al. |
| 8,869,042 B2 | 10/2014 | Kast |
| 8,886,797 B2 | 11/2014 | Gannu et al. |
| 8,893,042 B2 | 11/2014 | Laurie et al. |
| 8,893,043 B2 | 11/2014 | Dodson et al. |
| 8,903,834 B2 | 12/2014 | Ciancutti et al. |
| 8,910,070 B2 | 12/2014 | Goodger et al. |
| 8,914,399 B1 | 12/2014 | Paleja et al. |
| 8,972,391 B1* | 3/2015 | McDonnell ............ H04L 67/10 707/727 |
| 8,972,865 B2 | 3/2015 | Hansen et al. |
| 8,983,888 B2 | 3/2015 | Nice et al. |
| 8,996,530 B2 | 3/2015 | Luvogt et al. |
| 9,053,416 B1 | 6/2015 | De Leo et al. |
| D733,747 S | 7/2015 | Jeong et al. |
| 9,098,248 B2 | 8/2015 | Suzuki et al. |
| 9,098,551 B1 | 8/2015 | Fryz et al. |
| 9,122,989 B1 | 9/2015 | Morris et al. |
| D751,570 S | 3/2016 | Lee et al. |
| D751,571 S | 3/2016 | Lee et al. |
| D751,572 S | 3/2016 | Lee et al. |
| D752,601 S | 3/2016 | Lam |
| D752,636 S | 3/2016 | Yoon et al. |
| D755,805 S | 5/2016 | Zankowski et al. |
| D755,806 S | 5/2016 | Zankowski et al. |
| D755,832 S | 5/2016 | Liu et al. |
| D757,788 S | 5/2016 | Shrivastava |
| 9,348,898 B2 | 5/2016 | Nice et al. |
| 9,396,258 B2 | 7/2016 | Chu et al. |
| 9,405,741 B1 | 8/2016 | Schaaf et al. |
| D766,274 S | 9/2016 | Che et al. |
| 9,471,671 B1 | 10/2016 | Juang et al. |
| 9,473,803 B2 | 10/2016 | Wang |
| 9,569,785 B2 | 2/2017 | Alon et al. |
| 9,582,767 B2 | 2/2017 | Somekh et al. |
| 9,660,947 B1 | 5/2017 | Hart |
| 9,703,783 B2 | 7/2017 | Yi et al. |
| 9,785,883 B2 | 10/2017 | Luvogt et al. |
| 9,836,533 B1 | 12/2017 | Levi et al. |
| 9,836,765 B2 | 12/2017 | Hariri et al. |
| 9,846,836 B2 | 12/2017 | Gao et al. |
| D806,723 S | 1/2018 | Gussev et al. |
| 9,900,659 B1 | 2/2018 | Norum et al. |
| D828,369 S | 9/2018 | Arutyunyan et al. |
| D847,163 S | 4/2019 | Matsumura |
| 2002/0054164 A1 | 5/2002 | Uemura |
| 2002/0198882 A1 | 12/2002 | Linden et al. |
| 2004/0158497 A1 | 8/2004 | Brand |
| 2004/0260621 A1 | 12/2004 | Foster et al. |
| 2005/0076365 A1 | 4/2005 | Popov et al. |
| 2005/0097190 A1 | 5/2005 | Abdelhak |
| 2006/0031114 A1 | 2/2006 | Zommers |
| 2006/0041548 A1 | 2/2006 | Parsons et al. |
| 2006/0293065 A1 | 12/2006 | Chew et al. |
| 2008/0134043 A1* | 6/2008 | Georgis ............... H04N 7/10 715/733 |
| 2008/0222132 A1 | 9/2008 | Pan et al. |
| 2008/0243733 A1 | 10/2008 | Black |
| 2008/0250039 A1 | 10/2008 | Franks et al. |
| 2008/0256017 A1 | 10/2008 | Murakami |
| 2008/0266289 A1 | 10/2008 | Park |
| 2008/0294617 A1 | 11/2008 | Chakrabarti et al. |
| 2009/0006371 A1 | 1/2009 | Denoue |
| 2009/0006373 A1 | 1/2009 | Chakrabarti et al. |
| 2009/0055385 A1 | 2/2009 | Jeon et al. |
| 2009/0150935 A1 | 6/2009 | Peters et al. |
| 2009/0163183 A1 | 6/2009 | O'Donoghue et al. |
| 2009/0199113 A1 | 8/2009 | McWhinnie et al. |
| 2009/0249217 A1 | 10/2009 | Narayanaswami |
| 2009/0276368 A1 | 11/2009 | Martin et al. |
| 2009/0327941 A1 | 12/2009 | Fong et al. |
| 2010/0050067 A1 | 2/2010 | Curwen et al. |
| 2010/0070454 A1 | 3/2010 | Masuda et al. |
| 2010/0070928 A1 | 3/2010 | Goodger et al. |
| 2010/0131844 A1 | 5/2010 | Wohlert |
| 2010/0175018 A1 | 7/2010 | Petschnigg et al. |
| 2010/0205542 A1 | 8/2010 | Walman |
| 2010/0251304 A1 | 9/2010 | Donoghue et al. |
| 2010/0312650 A1 | 12/2010 | Pinckney et al. |
| 2010/0312724 A1 | 12/2010 | Pinckney et al. |
| 2011/0029636 A1 | 2/2011 | Smyth et al. |
| 2011/0035388 A1 | 2/2011 | Im et al. |
| 2011/0047136 A1 | 2/2011 | Dehn |
| 2011/0047491 A1 | 2/2011 | Hwang et al. |
| 2011/0066497 A1 | 3/2011 | Gopinath et al. |
| 2011/0072011 A1 | 3/2011 | Qiao |
| 2011/0107223 A1 | 5/2011 | Tilton et al. |
| 2011/0112981 A1 | 5/2011 | Park et al. |
| 2011/0125763 A1* | 5/2011 | Takanen .............. G06Q 10/00 707/749 |
| 2011/0179081 A1 | 7/2011 | Ovsjanikov et al. |
| 2011/0208732 A1 | 8/2011 | Melton et al. |
| 2011/0213761 A1 | 9/2011 | Song et al. |
| 2011/0246406 A1 | 10/2011 | Lahav et al. |
| 2011/0252050 A1 | 10/2011 | Palleti et al. |
| 2011/0258185 A1 | 10/2011 | Acharya et al. |
| 2011/0302117 A1 | 12/2011 | Pinckney et al. |
| 2011/0302158 A1 | 12/2011 | Sanders |
| 2011/0320450 A1 | 12/2011 | Liu et al. |
| 2012/0030159 A1 | 2/2012 | Pilaszy et al. |
| 2012/0054794 A1 | 3/2012 | Kim et al. |
| 2012/0059707 A1 | 3/2012 | Goenka et al. |
| 2012/0143871 A1 | 6/2012 | Liebald et al. |
| 2012/0158685 A1 | 6/2012 | White et al. |
| 2012/0159337 A1* | 6/2012 | Travilla ............ G06Q 30/0631 715/738 |
| 2012/0191776 A1 | 7/2012 | Ruffner et al. |
| 2012/0209907 A1 | 8/2012 | Andrews et al. |
| 2012/0254097 A1 | 10/2012 | Flinn et al. |
| 2012/0278767 A1 | 11/2012 | Stibel et al. |
| 2012/0304073 A1 | 11/2012 | Mandic et al. |
| 2012/0317104 A1 | 12/2012 | Radlinski et al. |
| 2012/0323349 A9 | 12/2012 | Khedouri et al. |
| 2013/0009990 A1 | 1/2013 | Hsu et al. |
| 2013/0024471 A1 | 1/2013 | Mitrovic |
| 2013/0031090 A1 | 1/2013 | Posse et al. |
| 2013/0041896 A1 | 2/2013 | Ghani et al. |
| 2013/0046772 A1 | 2/2013 | Gu et al. |
| 2013/0047112 A1 | 2/2013 | Waeller |
| 2013/0073988 A1 | 3/2013 | Groten et al. |
| 2013/0080968 A1* | 3/2013 | Hanson ............... G06F 3/0482 715/783 |
| 2013/0111395 A1 | 5/2013 | Ying et al. |

(56) References Cited

U.S. PATENT DOCUMENTS

| | | |
|---|---|---|
| 2013/0132515 A1 | 5/2013 | Mostafa et al. |
| 2013/0158693 A1 | 6/2013 | Beckmann et al. |
| 2013/0159243 A1 | 6/2013 | Wei et al. |
| 2013/0179252 A1* | 7/2013 | Dong .................. G06F 16/954 705/14.43 |
| 2013/0194308 A1 | 8/2013 | Privault et al. |
| 2013/0204737 A1 | 8/2013 | Agarwal et al. |
| 2013/0227054 A1 | 8/2013 | Zhang et al. |
| 2013/0262478 A1 | 10/2013 | Kemp et al. |
| 2013/0290110 A1 | 10/2013 | Luvogt et al. |
| 2013/0290905 A1 | 10/2013 | Luvogt et al. |
| 2013/0297698 A1 | 11/2013 | Odero et al. |
| 2013/0311408 A1 | 11/2013 | Bagga et al. |
| 2013/0346182 A1 | 12/2013 | Cheng et al. |
| 2013/0346234 A1 | 12/2013 | Hendrick et al. |
| 2014/0006399 A1 | 1/2014 | Vasudevan et al. |
| 2014/0025532 A1 | 1/2014 | Huang et al. |
| 2014/0025609 A1 | 1/2014 | Coster et al. |
| 2014/0032678 A1 | 1/2014 | Koukoumidis et al. |
| 2014/0040776 A1 | 2/2014 | Dann et al. |
| 2014/0074856 A1 | 3/2014 | Rao et al. |
| 2014/0095967 A1 | 4/2014 | Cheng et al. |
| 2014/0101142 A1* | 4/2014 | Gomez Uribe ....... G06F 16/435 707/723 |
| 2014/0101192 A1* | 4/2014 | Sabah .................. G06F 16/435 707/769 |
| 2014/0122605 A1 | 5/2014 | Merom et al. |
| 2014/0129500 A1 | 5/2014 | Nice et al. |
| 2014/0136528 A1 | 5/2014 | Anima et al. |
| 2014/0137013 A1 | 5/2014 | Matas |
| 2014/0143012 A1 | 5/2014 | Alon et al. |
| 2014/0143738 A1 | 5/2014 | Underwood et al. |
| 2014/0156681 A1 | 6/2014 | Lee et al. |
| 2014/0164365 A1 | 6/2014 | Graham |
| 2014/0172544 A1 | 6/2014 | Rabkin |
| 2014/0172545 A1 | 6/2014 | Rabkin |
| 2014/0181121 A1 | 6/2014 | Nice et al. |
| 2014/0189014 A1 | 7/2014 | Dolan et al. |
| 2014/0195890 A1 | 7/2014 | Taylor et al. |
| 2014/0201675 A1 | 7/2014 | Joo et al. |
| 2014/0207622 A1* | 7/2014 | Vijayaraghavan .......................... G06Q 30/0631 705/26.62 |
| 2014/0250390 A1 | 9/2014 | Holmes et al. |
| 2014/0278786 A1 | 9/2014 | Liu-Qiu-Yan |
| 2014/0280080 A1 | 9/2014 | Solheim et al. |
| 2014/0280221 A1 | 9/2014 | Chuang et al. |
| 2014/0280565 A1 | 9/2014 | Grewal |
| 2014/0298263 A1 | 10/2014 | Maeda et al. |
| 2014/0316930 A1 | 10/2014 | Jain et al. |
| 2014/0317105 A1 | 10/2014 | Jain et al. |
| 2014/0358916 A1 | 12/2014 | Anand et al. |
| 2014/0359489 A1 | 12/2014 | Zhao et al. |
| 2014/0365853 A1 | 12/2014 | Kleinhout et al. |
| 2014/0365854 A1 | 12/2014 | Karunamuni et al. |
| 2014/0379893 A1 | 12/2014 | Kannan et al. |
| 2014/0380219 A1 | 12/2014 | Cartan |
| 2015/0006286 A1 | 1/2015 | Liu et al. |
| 2015/0052003 A1 | 2/2015 | Tang et al. |
| 2015/0066643 A1 | 3/2015 | Choi et al. |
| 2015/0088921 A1 | 3/2015 | Somaiya et al. |
| 2015/0100587 A1 | 4/2015 | Walkingshaw et al. |
| 2015/0112801 A1 | 4/2015 | Nice et al. |
| 2015/0120712 A1 | 4/2015 | Yi et al. |
| 2015/0120722 A1 | 4/2015 | Martin et al. |
| 2015/0154197 A1 | 6/2015 | Lightner et al. |
| 2015/0161256 A1 | 6/2015 | Jeh |
| 2015/0161672 A1 | 6/2015 | Jung et al. |
| 2015/0169557 A1 | 6/2015 | Ciordas et al. |
| 2015/0178282 A1 | 6/2015 | Gorur et al. |
| 2015/0189070 A1 | 7/2015 | Baker |
| 2015/0242492 A1 | 8/2015 | Bhatt et al. |
| 2015/0269370 A1 | 9/2015 | Phillips |
| 2015/0269488 A1 | 9/2015 | Galai et al. |
| 2015/0278706 A1 | 10/2015 | Shivashankar et al. |
| 2015/0312348 A1 | 10/2015 | Lustgarten |
| 2015/0325094 A1 | 11/2015 | Cheng et al. |
| 2015/0330805 A1 | 11/2015 | Cho et al. |
| 2015/0331859 A1 | 11/2015 | Raichelgauz et al. |
| 2015/0331951 A1 | 11/2015 | Wang et al. |
| 2015/0347358 A1 | 12/2015 | Shultz et al. |
| 2015/0347920 A1 | 12/2015 | Medlock et al. |
| 2015/0370798 A1 | 12/2015 | Ju et al. |
| 2015/0378707 A1 | 12/2015 | Park et al. |
| 2015/0379146 A1 | 12/2015 | Tonse et al. |
| 2016/0004394 A1 | 1/2016 | MacAdaan et al. |
| 2016/0021179 A1* | 1/2016 | James .................. G06F 3/04817 709/204 |
| 2016/0055242 A1* | 2/2016 | Bradic .................. G06F 16/958 707/728 |
| 2016/0063065 A1 | 3/2016 | Khatri et al. |
| 2016/0070803 A1 | 3/2016 | Nuckolls |
| 2016/0110363 A1 | 4/2016 | Tkach et al. |
| 2016/0112760 A1 | 4/2016 | Kosseifi et al. |
| 2016/0147753 A1 | 5/2016 | Dimson et al. |
| 2016/0154887 A1 | 6/2016 | Zhao |
| 2016/0170982 A1 | 6/2016 | Djuric et al. |
| 2016/0188739 A1 | 6/2016 | Tang et al. |
| 2016/0196244 A1 | 7/2016 | Greenberg et al. |
| 2016/0210289 A1 | 7/2016 | Esinovskaya et al. |
| 2016/0274744 A1* | 9/2016 | Neumann ............ H04N 21/252 |
| 2016/0275804 A1 | 9/2016 | Koppel et al. |
| 2016/0299992 A1 | 10/2016 | Cetintas et al. |
| 2016/0328480 A1 | 11/2016 | Owens et al. |
| 2016/0350812 A1 | 12/2016 | Priness et al. |
| 2016/0371274 A1 | 12/2016 | Ng et al. |
| 2017/0011112 A1 | 1/2017 | Jing et al. |
| 2017/0017369 A1 | 1/2017 | Kanter et al. |
| 2017/0024391 A1 | 1/2017 | Steck |
| 2017/0024657 A1 | 1/2017 | Sahu et al. |
| 2017/0060870 A1 | 3/2017 | Checkley |
| 2017/0060872 A1 | 3/2017 | Sacheti et al. |
| 2017/0061014 A1 | 3/2017 | Heiler et al. |
| 2017/0061286 A1 | 3/2017 | Kumar et al. |
| 2017/0068992 A1 | 3/2017 | Chen et al. |
| 2017/0076318 A1 | 3/2017 | Goswami et al. |
| 2017/0083965 A1 | 3/2017 | Sun |
| 2017/0091194 A1 | 3/2017 | Spiegel |
| 2017/0103343 A1 | 4/2017 | Yee et al. |
| 2017/0124093 A1 | 5/2017 | Carbonell et al. |
| 2017/0132230 A1 | 5/2017 | Muralidhar et al. |
| 2017/0293865 A1 | 10/2017 | Sandler |
| 2017/0337612 A1 | 11/2017 | Galron et al. |
| 2018/0011937 A1* | 1/2018 | Tikhonov ........... G06Q 30/0255 |
| 2018/0012236 A1 | 1/2018 | Zhuo et al. |
| 2018/0014038 A1* | 1/2018 | Lamburt ................ H04L 47/80 |
| 2018/0020258 A1 | 1/2018 | Jeon et al. |
| 2018/0075137 A1 | 3/2018 | Lifar |
| 2018/0096388 A1 | 4/2018 | Lu |
| 2019/0069030 A1 | 2/2019 | Jackman et al. |
| 2019/0342616 A1* | 11/2019 | Domm ................ G06F 3/04883 |
| 2020/0090247 A1* | 3/2020 | Sokolov ................ G06N 20/00 |

FOREIGN PATENT DOCUMENTS

| | | |
|---|---|---|
| CN | 103473354 A | 12/2013 |
| CN | 103559262 A | 2/2014 |
| CN | 103678672 A | 3/2014 |
| CN | 103838842 A | 6/2014 |
| CN | 103942288 A | 7/2014 |
| CN | 104102696 A | 10/2014 |
| CN | 104317835 A | 1/2015 |
| CN | 104503973 A | 4/2015 |
| CN | 104636371 A | 5/2015 |
| CN | 303532062 S | 12/2015 |
| CN | 105893398 A | 8/2016 |
| CN | 103559262 B | 10/2016 |
| CN | 106446195 A | 2/2017 |
| CN | 106777229 A | 5/2017 |
| CN | 106802915 A | 6/2017 |
| CN | 106815297 A | 6/2017 |
| CN | 106874374 A | 6/2017 |
| CN | 107491813 A | 12/2017 |

(56) References Cited

FOREIGN PATENT DOCUMENTS

| | | | |
|---|---|---|---|
| CN | 107577682 A | 1/2018 | |
| CN | 104903889 B | 5/2018 | |
| CN | 108346072 A | 7/2018 | |
| EP | 3032780 A | 6/2016 | |
| JP | 2009015834 A | 1/2009 | |
| JP | 2015079395 A | 4/2015 | |
| KR | 20160064447 A | 6/2016 | |
| RU | 2368006 C1 | 9/2009 | |
| RU | 2417419 C2 | 4/2011 | |
| RU | 2417437 C2 | 4/2011 | |
| RU | 2419858 C2 | 5/2011 | |
| RU | 2451986 C2 | 11/2011 | |
| RU | 2509341 C2 | 3/2014 | |
| RU | 2523930 C2 | 7/2014 | |
| RU | 2013101601 A | 7/2014 | |
| RU | 2543315 C2 | 2/2015 | |
| RU | 2577193 C2 | 3/2016 | |
| RU | 2629449 C2 | 8/2017 | |
| RU | 2632100 C2 | 10/2017 | |
| RU | 2660602 C1 | 7/2018 | |
| RU | 2017101241 A | 7/2018 | |
| RU | 2663478 C2 | 8/2018 | |
| WO | 2002052374 A2 | 7/2002 | |
| WO | 2009087414 A1 | 7/2009 | |
| WO | 2013010698 A1 | 1/2013 | |
| WO | 2013189738 A1 | 12/2013 | |
| WO | 2014141078 A1 | 9/2014 | |
| WO | 2016030702 A1 | 3/2016 | |
| WO | 2019043381 A1 | 3/2019 | |

OTHER PUBLICATIONS

Search Report with regard to the counterpart RU Patent Application No. 2018132708 completed Feb. 18, 2020.
Search Report with regard to the counterpart RU Patent Application No. 2018132713 completed Feb. 21, 2020.
English Abstract for RU2017101241 retrieved on Espacenet on Mar. 12, 2020.
English Abstract for CN107577682 retrieved on Espacenet on Mar. 12, 2020.
English Abstract for CN108346072 retrieved on Espacenet on Mar. 12, 2020.
Office Action with regard to the counterpart U.S. Appl. No. 15/263,493 dated May 9, 2019.
Martin Beck, "Facebook Now Asks Why You're Hiding That Ad, to Better Target Them & Block Offensive Ones" (Sep. 11, 2014), Marketing Land, Social Media Marketing, Retrieved May 4, 2019, PDF Attached, https://marketingland.com/facebook-adjusts-news-feed-mix-suppress-ads-users-hide-99727 (Year: 2014).
English Abstract for CN104317835 retrieved on Espacenet on May 7, 2018.
English Abstract for CN105893398 retrieved on Espacenet on May 7, 2018.
English Abstract for CN106446195 retrieved on Espacenet on May 7, 2018.
English Abstract for KR20160064447 retrieved on Espacenet on May 7, 2018.
English Abstract for CN104102696 retrieved on Espacenet on May 8, 2018.
English Abstract for JP2015079395 retrieved on Espacenet on May 8, 2018.
English Abstract for CN106777229 retrieved on Espacenet on May 8, 2018.
English Abstract for CN103942288 retrieved on Espacenet on May 8, 2018.
English Abstract for CN103559262 retrieved on Espacenet on May 8, 2018.
English Abstract for CN106815297 retrieved on Espacenet on May 8, 2018.
English Abstract for CN106802915 retrieved on Espacenet on May 8, 2018.
English Abstract for CN107491813 retrieved on Espacenet on May 8, 2018.
English Abstract for CN104503973 retrieved on Espacenet on May 8, 2018.
English Abstract for CN106874374 retrieved on Espacenet on May 8, 2018.
English Abstract for CN104636371 retrieved on Espacenet on May 8, 2018.
Beemanapalli et al., "Incorporating Usage Information into Average-Clicks Algorithm", Lecture Notes in Computer Science, vol. 4811, 2007, pp. 21-35, https://link.springer.com/chapter/10.1007%2F978-3-540-77485-3_2.
English Abstract for CN103167330 retrieved on Espacenet on May 9, 2018.
English Abstract for CN103473354 retrieved on Espacenet on Jan. 4, 2019.
English Abstract for JP2009015834 retrieved on Espacenet on Mar. 21, 2019.
Notice of Allowance with regard to the counterpart U.S. Appl. No. 15/262,332 dated Mar. 18, 2019.
Office Action with regard to the counterpart U.S. Appl. No. 15/592,745 dated Mar. 8, 2019.
Office Action with regard to the counterpart U.S. Appl. No. 15/262,318 dated Apr. 1, 2019.
Notice of Allowance received with regard to the counterpart U.S. Appl. No. 29/590,781 dated Dec. 20, 2019.
Search Report with regard to the counterpat RU Patent Application No. 2018132716 completed Nov. 25, 2019.
English abstract of CN 103838842 retrieved from Espacenet on Feb. 3, 2017.
Brunner, Don't panic: Mozilla will be incorporating ads into Firefox, http://www.extremetech.com/internet/176521-dont-panic-mozilla-will-be-incorporating-ads-into-firefox, Feb. 12, 2014, retrieved on Nov. 11, 2016.
Mozilla / newnewtab, https://github.com/mozilla/newnewtab, retrieved on Nov. 11, 2016, 2 pages.
Brinkmann, Mozilla adds Suggested Sites feature to New Tab Page, May 15, 2015, http://www.ghacks.net/2015/05/15/mozilla-adds-suggested-sites-feature-to-new-tab-page/, retrieved on Nov. 11, 2016, 14 pages.
Lee, Mozilla Labs, New Tab Site Suggestions, https://blog.mozilla.org/labs/2012/11/new-tab-site-suggestions/, Nov. 2, 2012, retrieved on Nov. 11, 2016, 5 pages.
Opera Help, Speed Dial, http://help.opera.com/Windows/12.10/en/speeddial.html, retrieved on Nov. 11, 2016, 2 pages.
Sams, Windows 10 build 10120: Microsoft introduces a 'new tab' page for Edge, https://www.neowin.net/news/windows-10-build-10120-microsoft-introduces-a-039new-tab039-page-for-edge, May 18, 2015, retrieved on Nov. 11, 2016, 4 pages.
Russian Search Report from RU patent application No. 2015141291 dated Nov. 2, 2016.
Extended European Search Report from EP16190997, dated Feb. 16, 2017, Herry, Tzvetanka.
European Search report from EP 16185747, Siodmok, Wojciech, dated Jan. 18, 2017.
English abstract of CN103678672 retrieved from Espacenet on Jan. 20, 2017.
English abstract of CN103077220 retrieved from Espacenet on Jan. 20, 2017.
Russian Search Report dated Nov. 9, 2016 from Russian Patent Application No. 2015136684.
Amatriain et al., System Architectures for Personalization and Recommendation, http://techblog.netflix.com/2013/03/system-architectures-for.html, retrieved on May 30, 2015.
English Abstract of CN303532062 retrieved on Google Translate on Apr. 4, 2017.
Kumar et al., "Knowledge Retrieval from Web Server Logs Using Web Usage Mining", International Journal of Science and Research (IJSR), 2015, vol. 4, Issue 3, pp. 2173-2176.
Kim et al., "Ranking Web Documents with Dynamic Evaluation by Expert Groups", J. Eder and M. Missikoff (Eds.), CAISE, 2003, pp. 437-448.

(56) References Cited

OTHER PUBLICATIONS

Russian Search Report from RU patent application No. 2016127447 dated Feb. 7, 2017.
Pilaszy et al., "Fast ALS-based Matrix Factorization for Explicit and Implicit Feedback Datasets", RECSYS'10, 2010, pp. 71-78.
U.S. Appl. No. 15/236,538, filed Aug. 15, 2016.
U.S. Appl. No. 15/263,493, filed Sep. 13, 2016.
U.S. Appl. No. 15/262,318, filed Sep. 12, 2016.
U.S. Appl. No. 15/262,332, filed Sep. 12, 2016.
Design U.S. Appl. No. 29/590,781, filed Jan. 13, 2017.
U.S. Appl. No. 15/592,745, filed May 11, 2017.
U.S. Appl. No. 15/606,326, filed May 26, 2017.
U.S. Appl. No. 15/606,658, filed May 26, 2017.
U.S. Appl. No. 15/607,555, filed May 29, 2017.
Russian Search Report from RU patent application No. 2015141108 dated Sep. 7, 2016.
European Search Report dated Dec. 11, 2017 with regard to the counterpart patent application EP 17 18 9557.
Xiao et al., "Research and Implementation of Hybrid Recommendation Algorithm Based on Collaborative Filtering and Word2Vec", 8th International Symposium on Computational Intelligence and Design, 2015, pp. 172-175.
Koren et al., "Matrix Factorization Techniques for Recommender Systems", IEEE Computer Society, Computer, vol. 42, No. 8, 2009, pp. 42-49.
European Search Report dated Sep. 14, 2017 with regard to the counterpart patent application EP 17 18 0212.
European Search Report dated Sep. 18, 2017 with regard to the counterpart patent application EP 17 18 0214.
RU Search Report (completion date: May 25, 2017) with regard to the counterpart patent application RU 2016127446.
English Abstract for RU2013101601 retrieved on Espacenet on Nov. 2, 2017.
Youtube Account: RnStore, "Zmags Demo", (May 19, 2011), times stamp 1:54/3:56, 2:20/3:56, PDF Attached, URL: https://www.youtube.com/watch?v=AsBrLdoEJgA, received from USPTO on May 11, 2018 with regard to the U.S. Appl. No. 15/263,493.
Youtube Account: iappletech128, "Close Tabs in Safari by Swiping", (Oct. 20, 2013), time stamp 0:20-0:35/1:18, PDF Attached, URL: https://www.youtube.com/watch?v=V8TTbYrFSmg, received from USPTO on May 11, 2018 with regard to the U.S. Appl. No. 15/263,493.
Youtube Account: macmostvideo, "Viewing Photos With the Finder (MacMost Now 612)", (Sep. 30, 2011), time stamp 2:05-2:25, PDF Attached, URL: https://www.youtube.com/watch?v=tYoJI6G7Hkg, received from USPTO on May 11, 2018 with regard to the U.S. Appl. No. 15/263,493.
European Examination Report with regard to the counterpart patent application No. EP 16190999.9 dated Jun. 29, 2018.
U.S. Appl. No. 16/010,152, filed Jun. 15, 2018.
Notice of Allowance with regard to the counterpart U.S. Appl. No. 15/592,745 dated Oct. 11, 2018.
Disclosed Anonymously, "System, Method and Computer Program Product for Generating a Relationship-Based Recommendation", Apr. 28, 2006, 21 pages (Notice of Allowance with regard to the counterpart U.S. Appl. No. 15/592,745 dated Oct. 11, 2018).
Jim Bainbridge et al., "IBM DB2 Web Query for I Tutorials", Apr. 13, 2017, 570 pages (Notice of Allowance with regard to the counterpart U.S. Appl. No. 15/592,745 dated Oct. 11, 2018).
U.S. Appl. No. 16/009,929, filed Jun. 15, 2018.
Notice of Allowance received with regard to the counterpart U.S. Appl. No. 15/606,658 dated Jun. 26, 2019.
Office Action with regard to the counterpart U.S. Appl. No. 16/010,152 dated Apr. 7, 2020.
Search Report with regard to the counterpart RU Patent Application No. 2018135362 dated Mar. 26, 2020.
English Abstract for CN104903889 retrieved on Espacenet dated Apr. 16, 2020.

* cited by examiner

METHOD AND SYSTEM FOR DETERMINING A RELEVANCY PARAMETER FOR CONTENT ITEM

CROSS-REFERENCE

The present application claims priority from Russian Patent Application No. 2018132716, entitled "Method and System for Determining a Relevancy Parameter for Content Item", filed Sep. 14, 2018, the entirety of which is incorporated herein by reference.

FIELD

The present technology relates to recommendation systems in general and specifically to a method and a system for determining a relevancy parameter for a content item.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access to rich content (like images, audio, video, animation, and other multimedia content from such networks).

The volume of available information through various Internet resources has grown exponentially in the past couple of years. Several solutions have been developed in order to allow a typical user to find the information that the user is looking for. One example of such a solution is a search engine. Examples of the search engines include GOOGLE™ search engine, YANDEX™ search engine, YAHOO!™ search engine and the like. The user can access the search engine interface and submit a search query associated with the information that the user is desirous of locating on the Internet. In response to the search query, the search engine provides a ranked list of search results. The ranked list of search results is generated based on various ranking algorithms employed by the particular search engine that is being used by the user performing the search. The overall goal of such ranking algorithms is to present the most relevant search results at the top of the ranked list, while less relevant search results would be positioned on less prominent positions of the ranked list of search results (with the least relevant search results being located towards the bottom of the ranked list of search results).

The search engines typically provide a good search tool for a search query that the user knows apriori that she/he wants to search. In other words, if the user is interested in obtaining information about the most popular destinations in Italy (i.e. a known search topic), the user could submit a search query: "The most popular destinations in Spain?" The search engine will then present a ranked list of Internet resources that are potentially relevant to the search query. The user can then browse the ranked list of search results in order to obtain information she/he is interested in as it related to places to visit in Spain. If the user, for whatever reason, is not satisfied with the uncovered search results, the user can re-run the search, for example, with a more focused search query, such as "The most popular destinations in Spain in the summer?", "The most popular destinations in the South of Spain?", "The most popular destinations for a culinary getaway in Spain?".

There is another approach that has been proposed for allowing the user to discover content and, more precisely, to allow for discovering and/or recommending content that the user may not be expressly interested in searching for. In a sense, such systems recommend content to the user without an express search request based on explicit or implicit interests of the user.

An example of such a system is a FLIPBOARD™ recommendation system, which system aggregates and recommends content from various social networks. The FLIPBOARD recommendation system presents the uncovered content in a "magazine style" format, where the user can "flip" through the pages with the recommended/aggregated content. The recommendation system collects content from social media and other websites, presents it in magazine format, and allows users to "flip" through their social-networking feeds and feeds from websites that have partnered with the company, effectively "recommending" content to the user even though the user may not have expressly expressed her/his desire in the particular content.

Another example of the recommendation system is YANDEX.ZEN™ recommendation system. The Yandex.Zen recommendation system recommends digital content (such as articles, news, and video in a personalized feed on the Yandex.Browser start screen). As the user browses the Yandex.Zen server recommended content, the server acquires explicit (by asking whether the user likes to see more of such content in the user's feed) or implicit (by observing user content interactions) feedback. Using the user feedback, the Yandex.Zen server continuously improves the content recommendations presented to the given user.

US 2012/0209907 published on Aug. 16, 2012 to Andrews et al discloses a content aggregation and distribution service, which can execute in a cloud computing environment, provides content based on a broadcast user's topics of interest to a subscriber user based on the context of the subscriber. An example of a broadcast user is a celebrity. Content is automatically gathered about the broadcast user's designated topics of interest from online resources, and filtered and distributed based on a context of the subscriber. Some examples of online resources are websites, social networking sites, and purchase transaction systems. An example of broadcast content is a recommendation which may have been entered directly to the service or posted by the celebrity in his or her social networking account. Both the broadcast user and the subscriber can control respectively the distribution and reception of content with subscription settings. For examples, the settings may set limitations with respect to topics, contexts, and subscriber profile data.

US 2017/103343 published on Apr. 13, 2017 to Google Inc. discloses mechanisms for recommending content items based on topics are provided. In some implementations, a method for recommending content items is provided that includes: determining a plurality of accessed content items associated with a user, wherein each of the plurality of content items is associated with a plurality of topics; determining the plurality of topics associated with each of the plurality of accessed content items; generating a model of user interests based on the plurality of topics, wherein the model implements a machine learning technique to determine a plurality of weights for assigning to each of the plurality of topics; applying the model to determine, for a plurality of content items, a probability that the user would watch a content item of the plurality of content items; ranking the plurality of content items based on the determined probabilities; and selecting a subset of the plurality of content items to recommend to the user based on the ranked content items.

CN 103559262 that has a notification of grant of patent rights dated Jul. 29, 2016 to Beijing University pf Posts and Communications discloses a community-based author and academic paper recommending system and a recommending method. A double-layer quotation network consisting of an author layer and an academic paper layer is formed by utilizing a quotation relation between an author and the academic paper and the community information, then a user interesting model is established according to a historic behavior record of the user and the academic paper set read by the user, finally the user demand is analyzed according to the obtained double-layer quotation network and the user interesting model, and the author and academic paper thereof can be recommended to the user. The system is provided with an academic paper capturing module, an academic paper preprocessing module, a double-layer quotation network establishing module, a user interesting model establishing module and an individualized academic paper recommending module as well as a database. By adopting the recommending system and recommending method, not only can the correlation of the study content among users be used for establishing an author community through a subjective model, but also multiple attribute values of the to-be-recommended author and academic paper inside the community can be calculated, and the weakness that the calculation of the existing recommending algorithm is large can be improved; and meanwhile, multiple attribute values of the author and academic paper can be simultaneously calculated, so that the recommend result is more diversified, and the user requirement can be better met.

SUMMARY

It is an object of the present technology to ameliorate at least some of the inconveniences present in the prior art. Embodiments of the present technology may provide and/or broaden the scope of approaches to and/or methods of achieving the aims and objects of the present technology.

Developers of the non-limiting embodiments of the present technology have observed that, generally speaking, recommendation systems provide personalized content to users based on previous user interactions with the recommendation service that can be indicative of user preferences for some particular content rather than other content. Typically, the recommended content can come from two principal sources—a native source (native content) and an external source (non-native content).

The external sources are web sites on the Internet, such as news agencies, news aggregators and other source of content items, which can be presented to the users of the recommendation systems. On the other hand, the native sources are "bloggers" that post content using the recommendation system as a platform.

The non-limiting embodiments of the present technology have been developed based on developers' appreciation of at least one problem associated with the prior art approaches to implementations of the recommendations systems for recommending personalized content to users and, more specifically but not being so limited, recommendation of specialized content.

Within the non-limiting embodiments of the present technology, the specialized content means content of targeted or "niche" interest. Broadly speaking, some content may be of interest to a large proportion of general population of subscribers or users or the recommendation system. An example of such ubiquitously relevant content is an article about current affairs. Such an article is likely to be of interest to the majority of the users of the recommendation system. As another example, an article about an international sports event may of interest to a large portion of the users of the recommendation system, albeit the size of the pool of users interested in the sports related article may be smaller than that interested in the current affairs related article.

On another end of the "interest spectrum", there could be an article about a very niche (i.e. specialized) topic. For example, the could be content item generated by an author of digital content within the recommendation system (i.e. system native content) directed to antique photo cameras. Such a digital content item is of interest to a very small proportion of the pool of users of the recommendation system. Both in terms of absolute numbers and comparatively speaking when compared to the ubiquitously relevant content items (current affairs articles, sports articles, and the like).

As has been alluded to above, in order to recommend a given content item to the users, the recommendation system needs to predict relevance of the given content to a given user. In order to make such a prediction, the recommendation system uses previous interactions of users with the given content (amongst other features considered in the relevancy prediction). In other words, when users interact with or "explore" the given content item, the recommendation system uses these interactions for predicting the relevancy of the given content for recommending the given content item to the users (either the same user who performed the past interactions or a similar user who has a similar user profile or a "lookalike" for short).

However, for those content items available that are of niche interest and therefore are considered to be of "narrow relevancy"—i.e. it is highly relevant to a smaller portion of the users, while it may be completely irrelevant to the larger pool of users of the recommendation system, the general content selection algorithm of the recommendation system may not be appropriate as it will always leave them behind the more generally relevant items.

In other words, some content items (such as, the specialized content items) are not often selected by the pool of users (as a whole) or, in other words, not explored often by the general pool of users. Therefore, it is common for this type of content not to be often selected by a large majority of users and for that reason the amount of user interactions with such content is very limited. As such, the recommendation system lacks information related to user interactions with the specialized content.

This results in a cyclical "lack of exploration" problem for recommendation systems: (i) the recommendation system is not able to predict the relevance of specialized content due to the lack of (or not having enough of) previous user interactions therewith; (ii) the recommendation system does not select the specialized content for potential recommendation to users because the recommendation system is not able to predict its relevance; and (iii) the users of the recommendation system do not interact with the specialized content because it is not recommended to the users by the recommendation system.

In addition, providing the specialized content to random users does not solve the above-mentioned cyclical exploration problem for at least two reasons. Firstly, the specialized content is interesting (relevant) only to a narrow pool of users and, therefore, the chances are that random users will still ignore the specialized content and will not interact therewith. Secondly providing the specialized content to random users deteriorates the quality of the recommendation system as perceived by the random users since most of them are not interested in this content.

Therefore, the technical problem that the developers were set out to address was how to boost exploration (user interactions) of specialized content without deteriorating the quality of the recommendation system as perceived by the broader pool of users of the recommendation system.

Broadly speaking, the above technical problem is addressed as follows in accordance with at least of the non-limiting embodiments of the present technology.

As has been alluded to above, some authors of native content of the recommendation systems publish a certain type of specialized content. For example, a first author may publish content related to quantum mechanics. In another example, a second author may publish content related to advanced bio-informatics. A given user of the recommendation system who is interested in a given type of specialized content may subscribe to the author who publishes the given type of specialized content of interest to the given user, while users who are not interested in the given type of specialized content do not typically subscribe to the author. How the subscription to the channel is implemented is not particularly limited and may take several forms.

The non-limiting embodiments of the present technology are based on a premise that the subscribers to the given author can be considered as "core users" of the digital content items generated by the given content author/content source. The non-limiting embodiments of the present technology utilize the author-subscriber associations of such core users for "boosting" exploration of specialized content originated by such content authors without deteriorating the overall "quality" of the recommendation system as perceived by the general pool users. In other words, the non-limiting embodiments of the present technology aim at finding a proper exploration—exploitation balance in terms of the "one-arm bandit problem".

In accordance with the non-limiting embodiments of the present technology, the recommendation system is configured to provide specialized content to either just the subscribers of the content channel or additionally/alternatively to the users that are similar to the subscribers (i.e. the pool of core users) of the author that publishes the specialized content.

Since the specialized content is provided to users that are similar to the core users associated with the author that publishes the specialized content, the chances are that these users are also interested (as are the subscribers in the pool of core users) in the specialized content and are, therefore, more likely to interact therewith which results in an exploration boost of the specialized content. Additionally, user interaction of the core pool of users enables the recommendation system to create a base line for the specialized content to be used for ranking specialized content for showing to all users of the recommendation system.

Let it be assumed that a given specialized content author may generate published specialized content. As previously alluded to, some users, if they like the author's published specialized content, may subscribe to (or otherwise indicate their affiliation with) this author.

As such, these core users are provided by the recommendation system with specialized content published by the same author in question or similar (thematically) content to that published by the other authors. Now, the interactions of the core users with such specialized content may be used as an indication of relevancy of such specialized content not only to the core user in question, but to the larger population of the users of the recommendation system.

Indeed, interactions of the core users indicative of the affiliation to the new specialized content is an explicit indication by these core users that the new specialized content is relevant (interesting) to them and, therefore, may be potentially relevant to users at large. On the other hand, if these specially selected core users are not interested in this new specialized content—this is a clear indication of the content very unlikely to be relevant to the larger pool of users. In other words, non-limiting embodiments of the present technology contemplate drawing conclusions from the subscribers-authors associations in order to estimate relevancy of the author's specialized content for some other users of the general pool of users of the recommendation system.

More specifically, authors generate specialized content and provide it on their publication channels with the recommendation channels. As previously mentioned, users of the system who find the published specialized content of a given author relevant will most likely subscribe to the publication channel in order to be provided with the newly published specialized content when it is generated by the specialized content author, thus, indicating their association to the channel and the author of the content published on the channel.

Therefore, the recommendation system can identify an initial pool of subscribed users for a given specialized content author based on the subscriptions (or other explicit/implicit association to the channel/author). Optionally, similar users may be identified in many different ways. For example, "look-alike" features or metrics may be used for identifying similar users. In one implementation, a feature vector is generated for a potentially-similar user. Also, feature vectors for respective subscribed users may be generated. It is contemplated that an average feature vector may be generated for the pool of subscribed users which, in a sense represents features of an averaged subscribed user to the author. Then, different algorithms may be used for determining the distance between this average feature vector and the feature vector of the potentially-similar user. In some non-limiting embodiments of the present technology, these similar users are also added to the pool of core users.

In a sense, the non-limiting embodiments of the present technology "evens outs" the playing field for specialized content with the general interest content. It is noted that if the interactions of the core users with the specialized content bias the ranking of the given content item upwardly (i.e. if the recommendation system "gets it wrong") and the content is in fact not of interest to the general public, the standard ranking MLA used by the recommendation system to select digital content items for recommendation will eventually demote the specialized content and stop showing it.

In accordance with a first broad aspect of the present technology, there is provided a method of determining a relevancy parameter for a digital content item, the digital content item being originated from a content channel associated with a recommendation system. The relevancy parameter for ranking the digital content item as a recommended content item for users of the recommendation system, the recommendation system including a server and at least one client device connectable to the server via a communication network. The method is executable by the server, the server further being configured to execute a recommendation algorithm to generate a set of recommended content items for a given user of the recommendation system. The method comprises: identifying a pool of users associated with the content channel, a given user of the pool of users being associated with the content channel; in response to receiving a content recommendation request from a first client device associated with a first user that belongs to the pool of users: generating, using the recommendation algorithm, the set of recommended content items for the first user, a given item of the set of recommended content items not originating from the content channel; artificially inserting into the set of recommended items the digital content item; gathering an indication of user interactions of the first user with the set of recommended items, the user interactions indicative of the first user's propensity for the digital content item; and predicting relevancy parameter of the digital content item for a user outside of the pool of users based on the user interactions of the first user.

In some implementations of the method, the method further comprises: in response to receiving a content recommendation requests from other client devices associated with other users that belong to the pool of users: generating, using the recommendation algorithm, a respective set of recommended items for the other users, a given item of the respective set of recommended items not originating from the content channel; artificially inserting into the respective set of recommended items the digital content item.

In some implementations of the method, the method further comprises observing user interactions of the other users with the respective sets of content recommendations and generating an augmented relevancy parameter associated with the digital content item based on the user interactions of the other users with the respective sets of content recommendations.

In some implementations of the method, the predicting relevancy parameter of the digital content item for the user outside of the pool of users comprises: predicting the relevancy parameter based at least in part on the augmented relevancy parameter.

In some implementations of the method, the augmented relevancy parameter is upwardly biased relative to a native relevancy parameter that would be generated by the recommendation algorithm.

In some implementations of the method, the method further comprises: in response to receiving a content recommendation request from a second client device associated with a second user that is outside the pool of users: generating, using the recommendation algorithm, the set of recommended items for the second user, the set of recommended items including the digital content item, inclusion of the digital content item into the set of recommended items being based on the relevancy parameter; gathering an indication of user interactions of the second user with the set of recommended items, the user interactions indicative of the second user's propensity for the digital content item.

In some implementations of the method, in response to the user interactions of the second user being indicative of lower propensity for the digital content item of the second user when compared to the first user: adjusting the relevancy parameter of the digital content item to a lower value thereof.

In some implementations of the method, the artificially inserting the digital content item into the set of recommended items comprises: ranking the digital content item relative to other content items within the set of recommended items, the ranking being based on the predicted relevancy parameter of the digital content item.

In some implementations of the method, the artificially inserting the digital content item into the set of recommended items comprises: positioning the digital content item relative to other content items within the set of recommended items at a pre-determined position within the set of recommended items.

In some implementations of the method, the pre-determined position is selected such that to maximize a probability of the user interaction with the digital content item.

In some implementations of the method, the identifying the pool of users associated with the content channel comprises identifying the given user of the pool of users as being associated with the content channel based on at least one of: (i) an implicit association; and (ii) an explicit association.

In some implementations of the method, the implicit association comprises the first user having been presented with a prior content item from the content channel and the first user not providing an indication of negative propensity in response thereto.

In some implementations of the method, the explicit association comprises at least one of: the first user subscribing to the content channel, the user liking a prior content item from the content channel, and the user commenting on the prior content item from the content channel.

In some implementations of the method, the given item of the set of recommended items is originating from a network resource accessible via the communication network.

In some implementations of the method, the given item of the set of recommended items is one of a news article, an image, a video, and an interactive snippet.

In some implementations of the method, all items of the set of recommended items are not originating from the content channel.

In some implementations of the method, another given item of the set of recommended items is originating from a content channel being one of the content channel and another content channel.

In some implementations of the method, the content channel is a native channel to the recommendation system.

In accordance with another broad aspect of the present technology, there is provided a recommendation server for generating a digital content recommendation, the digital content recommendation for displaying on an electronic device associated with a user, the server connectable to the electronic device via a communication network, the recommendation server executing a ranking algorithm. The recommendation server comprises a processor configured to determine a relevancy parameter for a content item, the digital content item being originated from a content channel associated with the recommendation server. The relevancy parameter is for ranking the digital content item as a recommended content item for users of the recommendation server, the recommendation server including a server and at least one client device connectable to the server via a communication network. The method executable by the recommendation server, the processor of the recommendation server further being configured to execute a recommendation algorithm to generate a set of recommended content items for a given user of the recommendation server. The processor being further configured to: identify a pool of users associated with the content channel, a given user of the pool of users being associated with the content channel; in response to receiving a content recommendation request from a first client device associated with a first user that belongs to the pool of users: generate, using the recommendation algorithm, the set of recommended content items for the first user, a given item of the set of recommended content items not originating from the content channel; artificially insert into the set of recommended items the digital content item; gather an indication of user interactions of the first user with the set of recommended items, the user interactions indicative of the first user's propensity for the digital content item; and predict a relevancy parameter of the digital content item for a user outside of the pool of users based on the user interactions of the first user.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
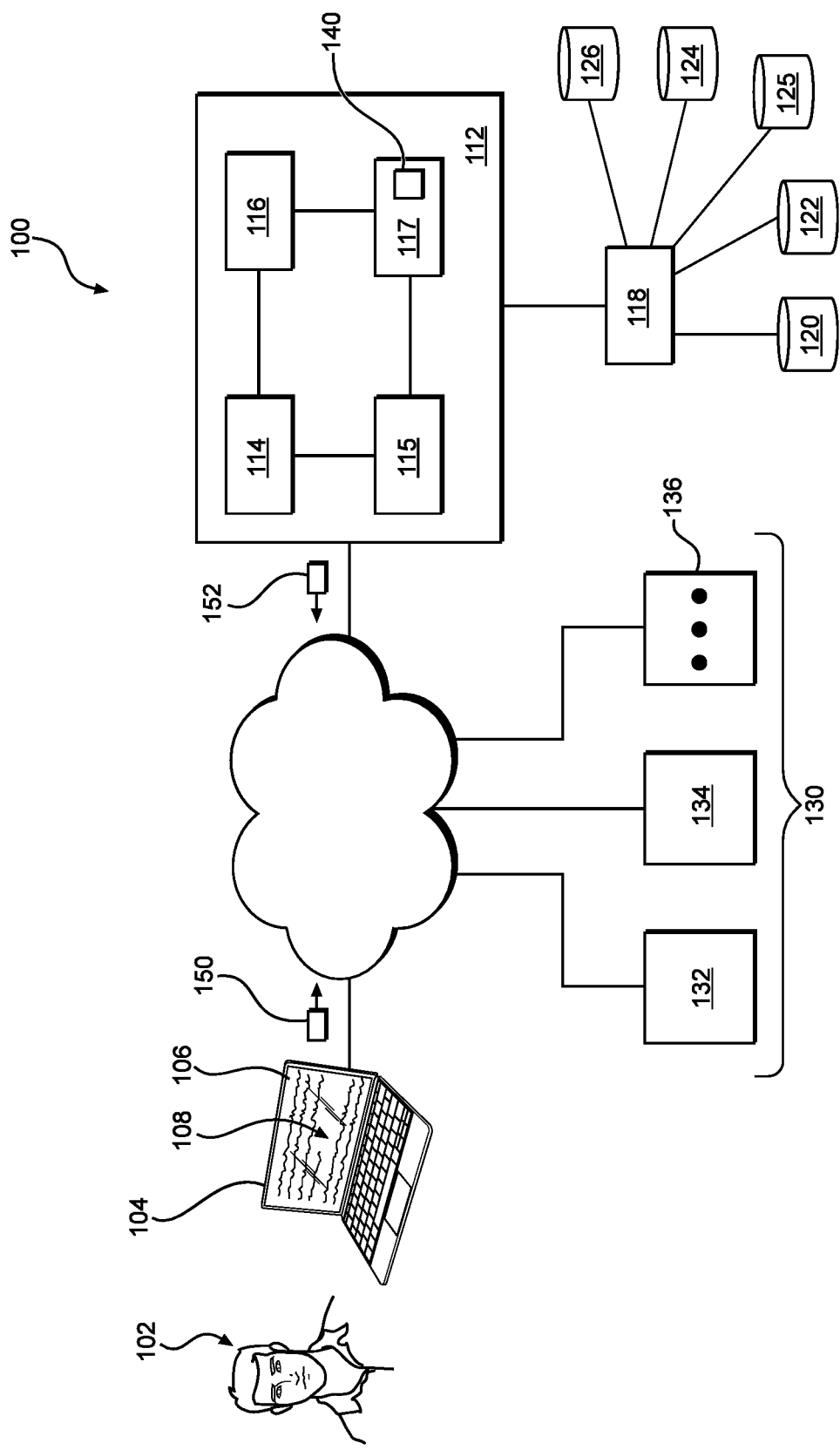
FIG. 1 depicts a diagram of a system implemented in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown. The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to provide content recommendations to a user 102 of the system 100. The user 102 may be a subscriber to a recommendation service provided by the system 100. However, the subscription does not need to be explicit or paid for. For example, the user 102 can become a subscriber by virtue of downloading a recommendation application from the system 100, by registering and provisioning a log-in/password combination, by registering and provisioning user preferences and the like. As such, any system variation configured to generate content recommendations for the given user can be adapted to execute embodiments of the present technology, once teachings presented herein are appreciated. Furthermore, the system 100 will be described using an example of the system 100 being a recommendation system (therefore, the system 100 can be referred to herein below as a "recommendation system 100" or a "prediction system 100"). However, embodiments of the present technology can be equally applied to other types of the systems 100, as will be described in greater detail herein below.

The system 100 comprises an electronic device 104, the electronic device 104 being associated with the user 102. As such, the electronic device 104 can sometimes be referred to as a "client device", "end user device" or "client electronic device". It should be noted that the fact that the electronic device 104 is associated with the user 102 does not need to suggest or imply any mode of operation—such as a need to log in, a need to be registered, or the like.

The implementation of the electronic device 104 is not particularly limited, but as an example, the electronic device 104 may be implemented as a personal computer (desktops, laptops, netbooks, etc.), a wireless communication device (such as a smartphone, a cell phone, a tablet and the like), as well as network equipment (such as routers, switches, and gateways). The electronic device 104 comprises hardware and/or software and/or firmware (or a combination thereof), as is known in the art, to execute a recommendation application 106. Generally speaking, the purpose of the recommendation application 106 is to enable the user to receive (or otherwise access) content recommendations provided by the system 100, as will be described in greater detail herein below.

How the recommendation application 106 is implemented is not particularly limited. One example of the recommendation application 106 may include a user accessing a web site associated with a recommendation service to access the recommendation application 106. For example, the recommendation application 106 can be accessed by typing in (or otherwise copy-pasting or selecting a link) an URL associated with the recommendation service. Alternatively, the recommendation application 106 can be an app downloaded from a so-called app store, such as APPSTORE™ or GOOGLEPLAY™ and installed/executed on the electronic device 104. It should be expressly understood that the recommendation application 106 can be accessed using any other suitable means. In yet additional embodiments, the recommendation application 106 functionality can be incorporated into another application, such as a browser application (not depicted) or the like. For example, the recommendation application 106 can be executed as part of the browser application, for example, when the user 102 first start the browser application, the functionality of the recommendation application 106 can be executed.

Figure 2:
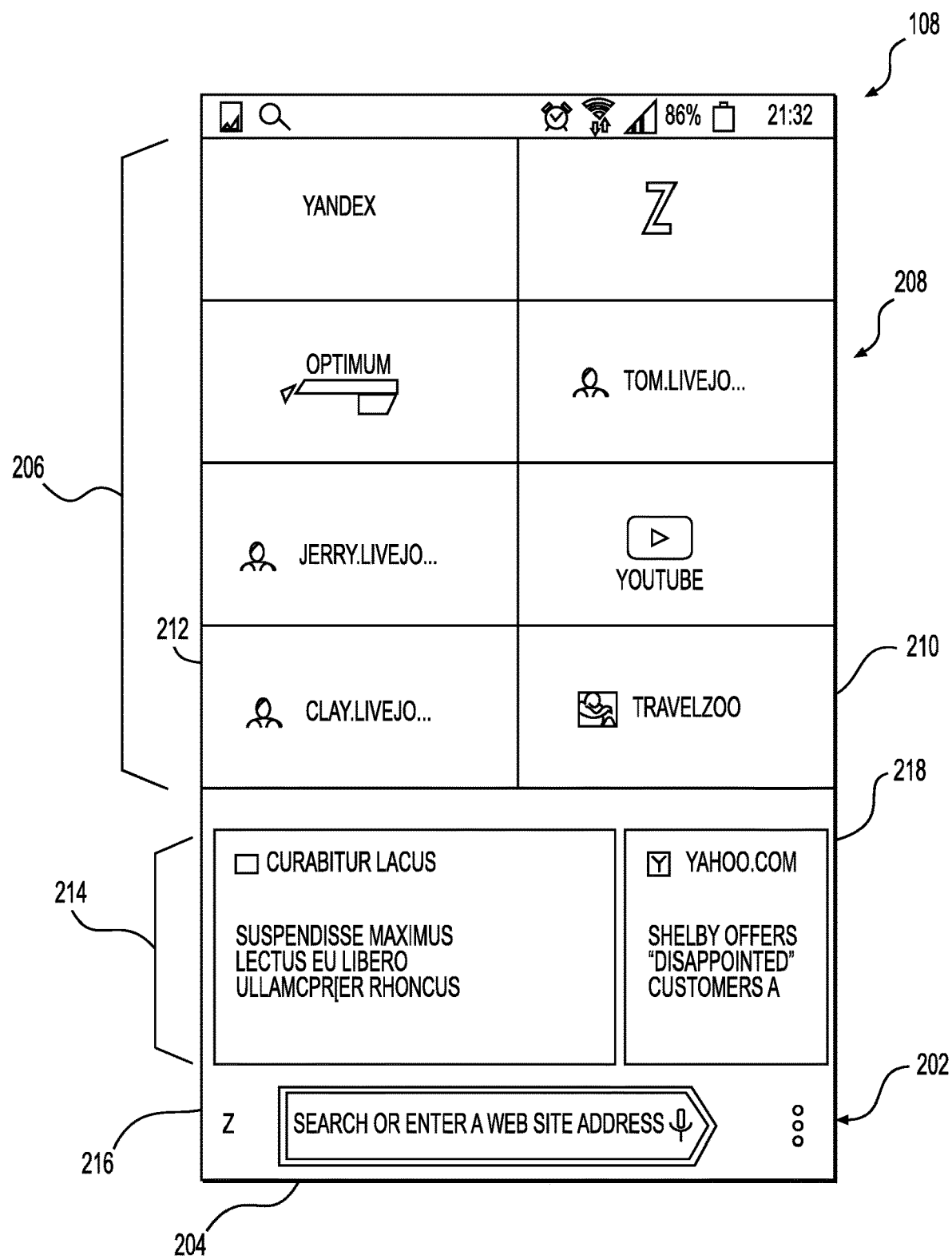
FIG. 2 depicts a screen shot of a recommendation interface implemented in accordance with a non-limiting embodiment of the present technology, the recommendation interface being depicted as displayed on the screen of an electronic device of the system of FIG. 1, the electronic device being implemented as a smart phone.

Generally speaking, the recommendation application 106 comprises a recommendation interface 108, the recommendation interface 108 being displayed on a screen (not separately numbered) of the electronic device 104. With reference to FIG. 2, there is depicted a screen shot of the recommendation interface 108 implemented in accordance with a non-limiting embodiment of the present technology (the example of the recommendation interface 108 being depicted as displayed on the screen of the electronic device 104 being implemented as a smart phone).

In some embodiments of the present technology the recommendation interface 108 is presented when the user 102 of the electronic device 104 actuates (i.e. executes, run, background-run or the like) the recommendation application 106. Alternatively, the recommendation interface 108 can be presented when the user 102 opens a new browser window and/or activates a new tab in the browser application. For example, in some embodiments of the present technology, the recommendation interface 108 can act as a "home screen" in the browser application.

The recommendation interface 108 includes a search interface 202. The search interface 202 includes a search query interface 204. The search query interface 204 can be implemented as an "omnibox" which allows entry of a search query for executing a search or a network address (such as a Universal Remote Locator) for identifying a network resource (such as a web site) to be accessed. However, the search query interface 204 can be implemented as configured to receive one or both of: entry of the search query for executing the search or the network address (such as a Universal Remote Locator) for identifying the network resource (such as a web site) to be accessed.

The recommendation interface 108 further includes a links interface 206. The links interface 206 includes a plurality of tiles 208—of which eight are depicted in FIG. 2 - only two of which are numbered in FIG. 2—a first tile 210 and a second tile 212.

Using the example of the first tile 210 and the second tile 212—each of the plurality of tiles 208 includes (or acts as) a link to either (i) a web site marked as "favourite" or otherwise marked by the user 102, (ii) a previously visited web site or (iii) the like. The plurality of tiles 208, in the depicted embodiment, is visually presented to the user 102 as square buttons with a logo and/or a name of the resource depicted therein, the logo and the name for enabling the user 102 to identify which resource the particular one of the plurality of tiles (not separately numbered) is linked to. However, it should be expressly understood that the visual representation of some or all of the plurality of tiles 208 can be different. As such, some or all of the plurality of tiles 208 can be implemented as differently shaped buttons, as hyperlinks presented in a list or the like.

As an example, the first tile 210 contains a link to a TRAVELZOO™ web site and the second tile 212 contains a link to a personal live journal web site. Needless to say, the number and content of the individual ones of the plurality of tiles 208 is not particularly limited.

For example, the number of the tiles within the plurality of tiles 208 can be pre-selected by the provider of the recommendation application 106. In some embodiments of the present technology, the number of tiles within the plurality of tiles 208 is pre-selected based on the size and/or resolution of the screen of the electronic device 104 executing the recommendation application 106. For example, a first number of tiles can be pre-selected for the electronic device 104 executed as a smartphone, a second number of tiles can be pre-selected for the electronic device 104 executed as a tablet, and a third number of tiles can be pre-selected for the electronic device 104 executed as a laptop or desktop computer.

The recommendation interface 108 further includes a recommended content set 214. The recommended content set 214 includes one or more recommended content items, such as a first recommended content item 216 and a second recommended content item 218 (the second recommended content item 218 only partially visible in FIG. 2). Naturally, the recommended content set 214 can have more recommended content items. In the embodiment depicted in FIG. 2 and in those embodiments where more than one recommended content item are present, the user 102 can scroll through the recommended content set 214. The scrolling can be achieved by any suitable means. For example, the user 102 can scroll the content of the recommended content set 214 by means of actuating a mouse device (not depicted), a key board key (not depicted) or interacting with a touch sensitive screen (not depicted) of or associated with the electronic device 104.

Example provided in FIG. 2 is just one possible implementation of the recommendation interface 108. Another example of the implementation of the recommendation interface 108, as well as an explanation of how the user 102 can interact with the recommendation interface 108 is disclosed in a co-owned United States Patent Application entitled A COMPUTER-IMPLEMENTED METHOD OF GENERATING A CONTENT RECOMMENDATION INTERFACE, filed on May 11, 2017 and bearing a publication number 20170329490 Al; content of which is incorporated by reference herein in its entirety.

How the content for the recommended content set 214 is generated will be described in greater detail herein below.

Returning to the description of FIG. 1, the electronic device 104 is communicatively coupled to a communication network 110 for accessing a recommendation server 112. In some non-limiting embodiments of the present technology, the communication network 110 can be implemented as the Internet. In other embodiments of the present technology, the communication network 110 can be implemented differently, such as any wide-area communication network, local-area communication network, a private communication network and the like. A communication link (not separately numbered) between the electronic device 104 and the communication network 110 is implemented will depend inter alia on how the electronic device 104 is implemented. Merely as an example and not as a limitation, in those embodiments of the present technology where the electronic device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the electronic device 104 is implemented as a notebook computer, the communication link can be either wireless (such as Wireless Fidelity, or WiFi® for short, Bluetooth® or the like) or wired (such as an Ethernet based connection).

The recommendation server 112 can be implemented as a conventional computer server. In an example of an embodiment of the present technology, the recommendation server 112 can be implemented as a Dell™ PowerEdge™ Server running the Microsoft™ Windows Server™ operating system. Needless to say, the recommendation server 112 can be implemented in any other suitable hardware, software, and/or firmware, or a combination thereof. In the depicted non-limiting embodiments of the present technology, the recommendation server 112 is a single server. In alternative non-limiting embodiments of the present technology, the functionality of the recommendation server 112 may be distributed and may be implemented via multiple servers.

The recommendation server 112 comprises a processing module 114. The processing module 114 is coupled to or otherwise has access to, a content discovery module 115, an analytics module 116, and a recommended content selection module 117. The recommendation server 112 has access to a data storage device 118. Operation of the recommendation server 112 and its components will be described herein below in greater detail.

The data storage device 118 includes a main database 120, an item feature database 122, a recommendable non-native content item database 124, a recommendable native content item database 125, and a user interaction database 126.

Also coupled to the communication network 110 are a plurality of network resources 130, including a first network resource 132, a second network resource 134 and a plurality of additional network resources 136. The first network resource 132, the second network resource 134 and the plurality of additional network resources 136 are all network resources accessible by the electronic device 104 (as well as other electronic devices potentially present in the system 100) via the communication network 110. In accordance with the non-limiting embodiments of the present technology, the first network resource 132, the second network resource 134 and the plurality of additional network resources 136 can be considered "non-native sources" by virtue of them being potential sources of non-native digital content items that can be recommended by the recommendation server 112.

The type of the respective content of first network resource 132, the second network resource 134 and the plurality of additional network resources 136 is not particularly limited.

A given one of the first network resource 132, the second network resource 134 and the plurality of additional network resources 136 can contain (or in other words, host) digital content (i.e. one or more digital items each of the one or more digital items having one or more types of digital content). In some embodiments of the present technology, the content of the digital items can include but is not limited to: audio content for streaming or downloading, video content for streaming or downloading, news, blogs, information about various government institutions, information about points of interest, thematically clustered content (such as content relevant to those interested in kick-boxing), other multi-media content, and the like.

In other embodiments of the present technology, the content of the digital items hosted by the first network resource 132, the second network resource 134 and the plurality of additional network resources 136 is text-based. Examples of the text-based content items include but are not limited to: news, articles, blogs, information about various government institutions, information about points of interest, thematically clustered content (such as content relevant to those interested in kick-boxing), and the like. It should be noted that "text-based" content does not intend to mean that the given digital item only contains text to the exclusion of other type of multi-media elements. On the contrary, the given text-based digital item includes text elements, as well as potentially other type of multi-media elements. For instance, a given text-based digital item that is an article may have text, as well as photos. As another example, a given text-based digital item that is a blog may include text, as well as embedded video elements.

The content is potentially "discoverable" to the electronic device 104 by various means. For example, the user 102 of the electronic device 104 can use a browser application (not depicted) and enter a Universal Resource Locator (URL) associated with the given one of the first network resource 132, the second network resource 134 and the plurality of additional network resources 136. Alternatively, the user 102 of the electronic device 104 can execute a search using a search engine (not depicted) to discover the content of one or more of the first network resource 132, the second network resource 134 and the plurality of additional network resources 136. As has been mentioned above, these are useful when the user 102 knows apriori which content the user 102 is interested in.

As has been alluded to above, in some embodiments of the present technology, the recommendation server 112 may provide a platform for digital content generation and publication. This can be particularly convenient for those users of the recommendation server 112 who wish to publish digital content but do not wish to spend time and/or significant amount of money for establishing a publication platform. It is noted that the publication platform provided by the recommendation server 112 can be provided based on a subscription, in exchange for the subscribers having to watch ads and/or for free and/or for a fee. Just as an example, the first native content channel may be associated with a blogger that publishes content items (such as the first content item 122) using the recommendation application 106 as a platform. The recommendable native content item database 125 can store native digital content items. For example, a given content item stored in the recommendable native content item database 125 can originate from a native content channel of the recommendation server 112.

In accordance with the non-limiting embodiments of the present technology, the recommendation application 106 can recommend content items that the user 102 may not apriori know about. These recommended content items can originate from either (i) the given one of the first network resource 132, the second network resource 134 and the plurality of additional network resources 136 to the user 102; or (ii) one or more native content channels associated with the recommendation server 112.

The recommendation server 112 is configured to select content for the one or more recommendation items to be presented to the user 102 via the recommendation application 106. More specifically, the processing module 114 is configured to (i) receive from the electronic device 104 a request for the content recommendation 150 and (ii) responsive to the request, generate a recommended content message 152 specifically customized for the user 102 associated with the electronic device 104. The processing module 114 can further coordinate execution of various routines described herein as performed by the content discovery module 115, the analytics module 116, and the recommended content selection module 117 for example.

The processing module 114 is configured to store, in the main database 120, information extracted during processing. Generally speaking, the main database 120 may receive data from the processing module 114 that was extracted or otherwise determined by the processing module 114 during processing for temporary and/or permanent storage thereof and may provide stored data to the processing module 114 for use thereof.

In some embodiments of the present technology, the request for the content recommendation 150 can be generated in response to the user 102 providing an explicit indication of the user desire to receive the content recommendation. For example, the recommendation interface 108 can provide a button (or another actuatable element) to enable the user 102 to indicate her/his desire to receive a new or an updated content recommendation. As a non-limiting example, the recommendation interface 108 can provide an actuatable button that reads "Request a content recommendation". Within these embodiments, the request for the content recommendation 150 can be thought of as "an explicit request" in a sense of the user 102 expressly providing a request for the recommended content.

In other embodiments, the request for the content recommendation 150 can be generated in response to the user 102 providing an implicit indication of the user desire to receive the content recommendation. In some embodiments of the present technology, the request for the content recommendation 150 can be generated in response to the user 102 starting the recommendation application 106.

Alternatively, in those embodiments of the present technology where the recommendation application 106 is implemented as a browser (for example, a GOOGLE™ browser, a YANDEX™ browser, a YAHOO! ™ browser or any other proprietary or commercially available browser application), the request for content recommendation 150 can be generated in response to the user 102 opening the browser application and can be generated, for example, without the user 102 executing any additional actions other than activating the browser application. As another example, the request for content recommendation 150 can be generated in response to the user 102 opening a new tab of the already-opened browser application and can be generated, for example, without the user 102 executing any additional actions other than activating the new browser tab. In other words, the request for the content recommendation 150 can be generated even without the user 102 knowing that the user 102 may be interested in obtaining a content recommendation.

As another example, the request for content recommendation 150 can be generated in response to the user 102 selecting a particular element of the browser application and can be generated, for example, without the user 102 executing any additional actions other than selecting/activating the particular element of the browser application.

Examples of the particular element of the browser application include but are not limited to:
An address line of the browser application bar
A search bar of the browser application and/or a search bar of a search engine web site accessed in the browser application
An omnibox (combined address and search bar of the browser application)
A favourites or recently visited network resources pane
Any other pre-determined area of the browser application interface or a network resource displayed in the browser application How the recommended content selection module 117 recommends content items in response to the request for the content recommendation 150 will be explained in more detail herein below.

In some embodiments of the present technology, the content discovery module 115 can be configured to execute a "crawler" operation. In other words, the content discovery module 115 can execute a robot that "visits" a plurality of resources (such as the plurality of network resources 130 including the first network resource 132, the second network resource 134 and the plurality of additional network resources 136) and catalogues one or more digital items hosted by a respective one of the first network resource 132, the second network resource 134 and the plurality of additional network resources 136. In some embodiments of the present technology, the content discovery module 115 can catalogue the digital items into an inverted index mapping a given digital item to a list of key words associated with the given digital item.

As part of the crawling function, the content discovery module 115 is configured to maintain information representative of the newly discovered network resources and/or newly discovered content available therefrom. In some embodiments, the content discovery module 115 can be configured to maintain an inverted index as an example in the recommendable non-native content item database 124 within the data storage device 118, but the recommended content selection module 117 can arrange the information representative of the newly discovered network resources and/or newly discovered content available therefrom in a data structure other than an inverted index. In other embodiments, the content discovery module 115 may also be configured to extract features from the newly discovered network resources and/or newly discovered content available, and store the associated features, as a non-limiting example, in the item feature database 122.

In alternative embodiments of the present technology, rather than executing its dedicated content discovery module 115, the recommendation server 112 can share the functionality of content discovery module 115 with another server (not depicted) and/or another service (not depicted). For example, the functionality of the content discovery module 115 can be shared with a search engine server (not depicted) executing a search engine service. When the content discovery module 115 crawls and indexes new resources that may potentially host text-based or other digital items, the content discovery module 115 can also index such newly discovered (or updated) digital items for the purposes of the recommendation server 112 routines described herein.

The recommendable non-native content item database 124 stores information/content associated with a pool of potentially recommendable non-native content items by the recommendation service and that comprises some or all the digital content items discovered by the content discovery module 115.

The nature of one or more potentially recommendable non-native content items within the pool of recommendable non-native content items is not particularly limited. Some examples of the one or more potentially recommendable non-native content items include but are not limited to digital content items such as:
  a news item;
  a publication;
  a web resource;
  a post on a social media web site;
  a new item to be downloaded from an application store;
  a new song (music track) to play/download from a resource;
  an audiobook to play/download from a resource;
  a podcast to play/download from a resource;
  a new movie (video clip) to play/download from a resource;
  a product to be bought from a resource; and
  a new document uploaded for viewing on a social media web site (such as a new photo uploaded to an INSTRAGRAM™ or FACEBOOK™ account).

By the same token, the recommendable native content item database 125 information/content associated with a pool of potentially recommendable native content items by the recommendation service.

The nature of one or more potentially recommendable native content items within the pool of recommendable native content items is not particularly limited. Some examples of the one or more potentially recommendable native content items include but are not limited to digital content items such as:
  a user-generated publication;
  a user-generated blog post;
  a user-generated photograph;
  a user-generated video.

Thus, it can be said that the pool of potentially recommendable content items can comprise (i) at least one item from the respective pluralities of items associated with the plurality of network resources 130 and (ii) at least one content item from the one or more native content sources.

The pool of potentially recommendable content items may then be recommended to users of the recommendation service by the recommended content selection module 117.

The analytics module 116 is configured to (i) track interactions of users with content items that were previously recommended by the recommendation service, and store the user interactions in the user interaction database 126, and (ii) extract information related to item features associated with, for example, content items that were previously recommended by the recommendation service to its previous users and with which at least one previous user has interacted in the item feature database 122.

Examples of user events/interactions associated with previous users of the system 100 tracked by the analytics module 116 and stored in the user interaction database 126 include but are not limited to:
  a given user of the recommendation system "scrolled over" a given item;
  a given user of the recommendation system "liked" or "disliked" the given item;
  a given user of the recommendation system shared the given item;
  a given user of the recommendation system has clicked on (or otherwise selected) the given item;
  a given user of the recommendation system has spent time consulting the given item before returning to the recommendation system; and
  a given user of the recommendation system has purchased/ordered/downloaded the given item.

As a non-limiting example, each of the user events/interactions in the user interaction database 126 may be associated with a respective timestamp, a respective content item, and a respective user.

Examples of item features extracted by the analytics module 116 and stored in the item feature database 122 include but are not limited to:
  popularity of a given item amongst users of the recommendation service (for example, in case of the given item being a music track, how many times this given music track has been listened to/downloaded by users of the recommendation service);
  a number of likes/purchases/downloads/clicks amongst all events associated with the given item and that have been performed via the recommendation service; and
  item-inherent characteristics that are based on content of the respective content item—in case of the given item being a music track—length of the track, the genre of the track, audio-characteristic of the track (for example, tempo of the track); other item-inherent characteristics include: the price of the given item, the dimensions of the given item, the category of the given item, the producer/maker of the item, the length of the document measured in words or symbols; category/theme of the document; movie rating on a movie rating host, etc.

It should be expressly understood that the user events and the item features may take many forms and are not specifically limited. As such, above presented lists of non-limiting examples of the way that the user events and the item features may be implemented are just examples thereof. As such, it should be expressly understood that many other alternative implementations of the user events and the item features may be contemplated in different implementations of the present technology.

How information is obtained and stored in the item feature database 122, the recommendable non-native content item database 124, the recommendable native content item database 125 and the user interaction database 126 is not particularly limited.

For example, the information related to the item features may be obtained from a particular service that maintains information about various items available therefrom and the like; and stored in the item feature database 122. The information related to the item features may be divided into various categories representative of various types or topics of items.

The recommended content selection module 117 can be configured to execute one or more machine learning algorithms (MLAs) to recommend content items to users of the content recommendation service. In some embodiments of the present technology, one or more machine learning algorithms can be any suitable or semi-supervised supervised machine learning algorithm, such as but not limited to:

Artificial neural network
Bayesian statistics
Gaussian process regression
Decision trees
And the like.

Generally speaking, the recommended content selection module 117 executes one or more MLAs to analyze the indexed content items (i.e. those discovered and indexed by the content discovery module 115 in the recommendable non-native content item database 124 and the recommendable native content item database 125 within the data storage device 118) to select one or more of the digital content items as recommended content items for the user 102. The one or more MLAs executed by the recommended content selection module 117, may as an example, in response to the request for the content recommendation 150, select one or more indexed content items as recommended content items for the user 102 based on (i) one or more item features of the indexed content items from the item feature database 122; and (ii) previous user interactions with indexed content items (associated with the user 102 or other users of the recommendation service) in the user interaction database 126.

It should be noted that even though the content discovery module 115, the analytics module 116, and the recommended content selection module 117 have been described as separate entities each executing its respective functionalities, in alternative embodiments of the present technology, the functionality executed by the content discovery module 115, the analytics module 116, and the recommended content selection module 117 can be executed by a single entity (such as the processing module 114, for example). Alternatively, the functionality executed the content discovery module 115, the analytics module 116, and the recommended content selection module 117 can be distributed amongst more modules than the ones depicted in FIG. 1 and can be executed as part of multiple instances of the recommendation server 112.

Furthermore, each one of the content discovery module 115, the analytics module 116, and the recommended content selection module 117 can execute additional functions (i.e. others than the respective functions described herein).

It should be noted that even though the main database 120, the item feature database 122, the recommendable non-native content item database 124, recommendable native content item database 125, and the user interaction database 126 are depicted as separate databases, this does not need to be so in each and every embodiment of the present technology. As such, some or all of the main database 120, the item feature database 122, the recommendable non-native content item database 124, recommendable native content item database 125, and the user interaction database 126 may be implemented in a single database. Furthermore, any one of the main database 120, the item feature database 122, the recommendable non-native content item database 124, recommendable native content item database 125, and the user interaction database 126 may, in itself, be split into several distributed storages devices (not depicted).

In accordance with the non-limiting embodiments of the present technology, the recommended content selection module 117 is configured a content exploration module 140. Broadly speaking, the content exploration module 140 is configured to determine a relevancy parameter for a digital content item. In a specific non-limited embodiment of the present technology, the content exploration module 140 is configured to determine the relevancy parameter for one or more native digital content items. In a specific non-limited embodiment of the present technology, the content exploration module 140 is configured to determine the relevancy parameter for one or more native digital content items that are associated with a specialized topic. In other words, the content exploration module 140 can be configured to determine the relevancy parameter for one or more native digital content items that are associated with a topic of niche interest. In alternative non-limiting embodiments of the present technology, the content exploration module 140 can configured to determine the relevancy parameter for one or more native digital content items that do not have enough past user interaction data stored in the user interaction database 126.

In yet further non-limiting embodiments of the present technology, the methods described herein below can be applied to determining the relevancy parameter for one or more non-native digital content items that do not have enough past user interaction data stored in the user interaction database 126.

In a specific non-limiting embodiment of the present technology, the content exploration module 140 is configured to determine the relevancy parameter for one or more native digital content items that are originated from a content channel of the system 100. The content channel can be associated with a channel author, who in turn can be a subscriber to the publication platform provided within the system 100, as has been alluded to above.

Figure 3:
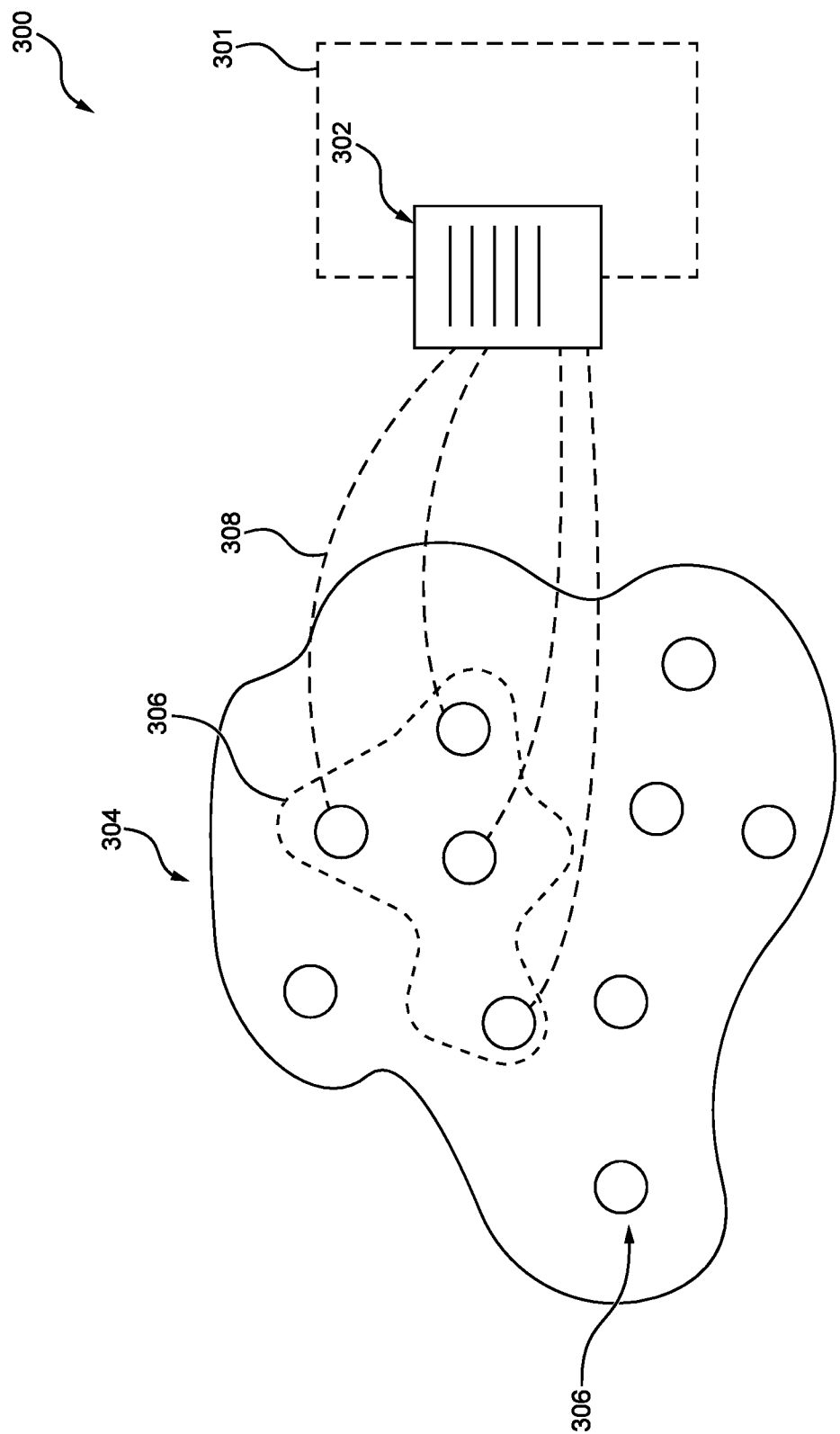
FIG. 3 depicts a schematic representation of a process for identifying a pool of users associated with a content channel, the process executable by the system of FIG. 1.

With reference to FIG. 3, there is depicted a schematic representation of a process 300 for identifying a pool of users 306 associated with a content channel 301. As depicted in FIG. 3, the content channel 301 originates at least one digital content item—shown in FIG. 3 as a digital content item 302.

Also depicted in FIG. 3 is a plurality of users 304. The plurality of users 304 include all users of the system 100—i.e. those users who access the system 100 for the receiving digital content items recommendations. There is also depicted the pool of users 306, which is a subset of the plurality of users 306. The pool of users 306 contain those users of the plurality of users 304 who are associated with the content channel 301. These associations are schematically depicted in FIG. 3 at 308.

A given association 308 can be at least one of: (i) an implicit association; and (ii) an explicit association. In some non-limiting embodiments of the present technology, the implicit association can manifest itself in the user 102 having been presented with a prior content item from the content channel 301 and the user 102 not providing an indication of negative propensity in response thereto. On the other hand, the explicit association can manifest itself in at least one of: the user 102 subscribing to the content channel 301, the user 102 liking a prior content item from the content channel 301, and the user 102 commenting on the prior content item from the content channel 301.

As such, in accordance with the non-limiting embodiments of the present technology, the content exploration module 140 determines the pool of users 306 can be thought as "core users" for the content channel 301. The content exploration module 140 can repeat such determination for all other content channels similar to the content channel 301. In some non-limiting embodiments of the present technology, such determination of the pool of users 306 can be executed "offline". In accordance with the non-limiting embodiments of the present technology, the term "offline" refers to a moment in time prior to receiving a digital content recommendation request (i.e. the aforementioned request for the content recommendation 150) from the user 102. In some other specific non-limiting embodiments of the present technology, the term "offline" may additionally or alternatively mean a moment in time, when the demand for the content recommendations can be low (such as, for example, in a middle of the night or the like).

Figure 4:
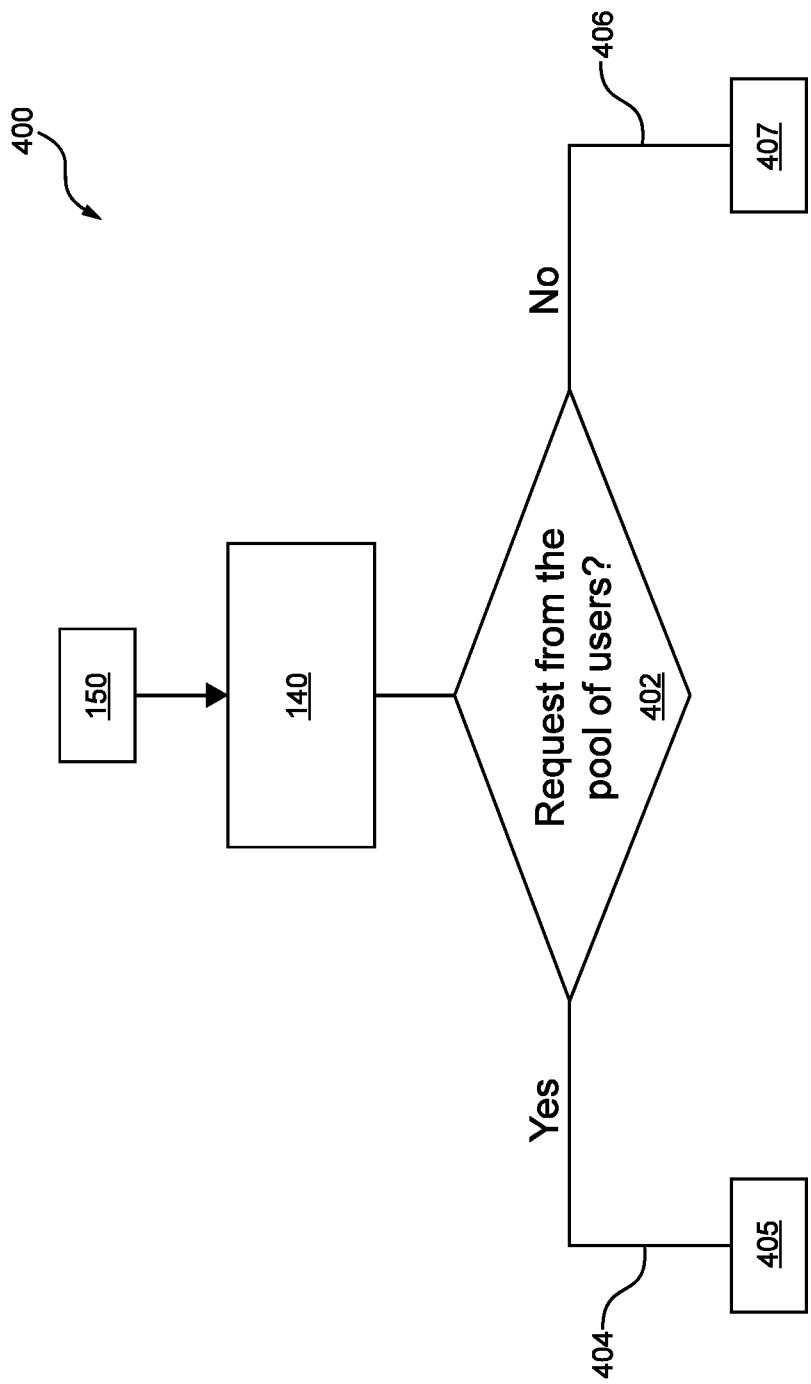
FIG. 4 depicts a schematic representation of exploration process executed by a content exploration module of the system of FIG. 1.

With reference to FIG. 4, there is depicted a schematic representation of exploration process 400 executed by the content exploration module 140. When the content exploration module 140 receives a given instance of the content recommendation 150. The content exploration module 140 then determines, as part of a step 402 of the exploration process 400, whether or not the content recommendation 150 is originated from the user 102 who is part of any of the pools of the core users, such for example, the pool of users 306 associated with the content channel 301.

In response to the content exploration module 140 determining (at step 404 of the exploration process 400) that the content recommendation 150 has indeed originated from the user 102 who is part of any of the pools of the core users, such for example, the pool of users 306 associated with the content channel 301; the content exploration module 140 executes a relevancy parameter exploration routine 405.

In response to the content exploration module 140 determining (at step 406 of the exploration process 400) that the content recommendation 150 has not originated from the user 102 who is part of any of the pools of the core users, such for example, the pool of users 306 associated with the content channel 301; the content exploration module 140 executes a standard content recommendation routine 407.

In some non-limiting embodiments of the present technology, the content exploration module 140 executes the relevancy parameter exploration routine 405 for each one of the content channels 301. In some other specific non-limiting embodiments of the present technology, the content exploration module 140 executes the relevancy parameter exploration routine 405 for each one of the content channels 301 that is determined to be associated with specialized content. In some other specific non-limiting embodiments of the present technology, the content exploration module 140 executes the relevancy parameter exploration routine 405 for each one of the content channels 301 that is determined to be associated with niche content. In some other specific non-limiting embodiments of the present technology, the content exploration module 140 executes the relevancy parameter exploration routine 405 for each one of the content channels 301 that lacks past user interaction information (i.e. no data or limited data stored in the user interaction database 126 in associated with the digital content originated from the content channel 301).

In some non-limiting embodiments of the present technology, for the given one of the content channels 301, the content exploration module 140 continues executing the relevancy parameter exploration routine 405 until sufficient explorative information is obtained (will be explained in greater detail herein below). In other non-limiting embodiments of the present technology, the content exploration module 140 can repeat executing the relevancy parameter exploration routine 405 from time to time, even after the sufficient explorative information is obtained, for example, in order to update the explorative information, which may change over time.

As part of the relevancy parameter exploration routine 405, the content exploration module 140 causes the recommended content selection module 117 as part of generating the set of recommended content items for the user 102 to artificially insert into the set of recommended items an explorative content item originating from the content channel 301, such as the digital content item 302.

In some non-limiting embodiments of the present technology, the artificially inserting the digital content item into the set of recommended items comprises: ranking the digital content item relative to other content items within the set of recommended items, the ranking being based on the predicted relevancy parameter of the digital content item. This can be done, for example, by amending or over-riding the ranking algorithm.

In some non-limiting embodiments of the present technology, the artificially inserting the digital content item into the set of recommended items comprises: positioning the digital content item relative to other content items within the set of recommended items at a pre-determined position within the set of recommended items. For example, the artificially inserting the digital content item may include positioning the digital content item on a pre-determined position, such as a first position, a second position, or the like.

In some non-limiting embodiments of the present technology, the pre-determined position is selected such that to maximize a probability of the user interaction with the digital content item. Such position can be determined empirically or using any known WIN—LOSS algorithm Broadly speaking, in accordance with the non-limiting embodiments of the present technology, the relevancy parameter exploration routine 405 is built on the premise of exploring content relevancy of specialized content using core users that are associated with the content channel 301 that is at least tangentially related to such specialized content.

Without wishing to be bound to any specific theory, embodiments of the present technology are built on the premise that even if the core users (i.e. those in the pool of users 306) who have demonstrated affinity to the content channel 301 do not show interest in the digital content item 302 (through a positive interaction, click or any other affinity-demonstrating activity), then the digital content item 302 is unlikely to be of interest to a wide population of users of the system 100 and, thus, should be associated with a lower value of the relevancy parameter.

On the other hand, if the core users (i.e. those in the pool of users 306) who have demonstrated affinity to the content channel 301 do show interest in the digital content item 302 (through a positive interaction, click or any other affinity-demonstrating activity), then the digital content item 302 may potentially be of interest to the wider population of users of the system 100 and, thus, should be associated with a lower value of the relevancy parameter. In this case, the relevancy parameter exploration routine 405 can assign the digital content item 302 with a higher value of the relevancy parameter, which can then then be used for ranking the digital content item 302 as part of the standard content recommendation routine 407.

Therefore and without wishing to be bound to any specific theory, the embodiments of the present technology and, specifically, execution of the relevancy parameter exploration routine 405 allows to "promote" the specialized/niche content for inclusion in the sets of recommended items as part of the standard content recommendation routine 407. Without implementing embodiments of the present technology, such specialized/niche content may never become part of the sets of recommended items and, therefore, may never "have a chance" to collect enough user interaction history to be fairly judged by the ranking algorithm of the system 100. Embodiments of the present technology allow for the specialized/niche content to "start on the same foot" as the general popularity content as far as the ranking algorithm of the system 100 is concerned.

It should be noted, however, if it turns out that the given specialized content of the digital content item 302 was of interest to the core users (and, therefore, got a higher value of the relevancy parameter by the relevancy parameter exploration routine 405, but indeed was not of interest to the general population of the users of the recommendation system, the relevancy parameter of the digital content item 302 will eventually get pessimized by lack of interactions of other users when the digital content item 302 is recommended to the other users as part of the standard content recommendation routine 407.

In other words, embodiments of the present technology contemplate; (i) gathering an indication of user interactions of the user 102 with the set of recommended items, the user interactions indicative of the first user's propensity for the specialized content item (as part of the relevancy parameter exploration routine 405); in order to predict relevancy parameter of the digital content item 302 for a user outside of the pool of users 306 based on the user interactions of the user 102 in (i) above (the predicting being done as part of the standard content recommendation routine 407).

Given the architecture described above, it is possible to execute a method of determining a relevancy parameter for a digital content item, the digital content item being originated from a content channel 301 associated with the recommendation system 100. In accordance with the non-limiting embodiments of the present technology, the relevancy parameter can be used for ranking the digital content item as a recommended digital content item for users of the recommendation system 100 using a recommendation algorithm of the recommendation system 100.

Figure 5:
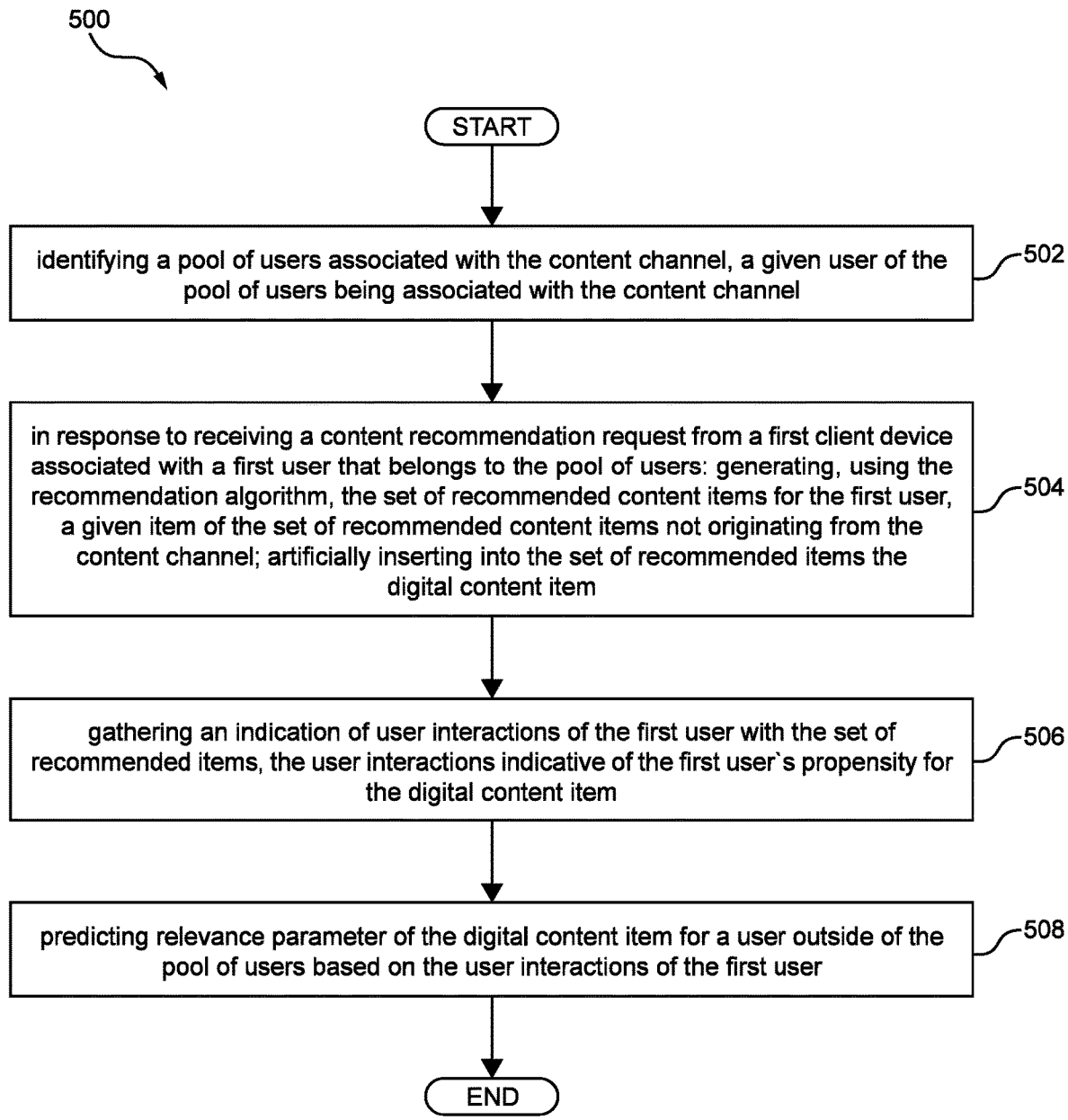
FIG. 5 depicts a block diagram showing a flow chart of a method, the method being executable in accordance with the non-limiting embodiments of the present technology, the method executed by the system of FIG. 1.

With reference to FIG. 5, there is depicted a block diagram showing a flow chart of a method 500, the method 500 being executable in accordance with the non-limiting embodiments of the present technology. The method 500 can be executed by the content exploration module 140 of the recommendation server 112.

Step 502—identifying a pool of users associated with the content channel, a given user of the pool of users being associated with the content channel based on at least one of: (i) an implicit association; and (ii) an explicit association At step 502, the content exploration module 140 of the recommendation server 112 identifies a pool of users associated with the content channel. As has been described above the content exploration module 140 identifies the pool of users 306 associated with the content channel 301. The given user of the pool of users 306 can be associated with the content channel based 301 on at least one of: (i) an implicit association; and (ii) an explicit association.

Step 504—in response to receiving a content recommendation request from a first client device associated with a first user that belongs to the pool of users: generating, using the recommendation algorithm, the set of recommended content items for the first user, a given item of the set of recommended content items not originating from the content channel; artificially inserting into the set of recommended items the digital content item; gathering an indication of user interactions of the first user with the set of recommended items, the user interactions indicative of the first user's propensity for the digital content item At step 504, in response to receiving a content recommendation request from a first client device associated with a first user that belongs to the pool of users 306, the content exploration module 140 of the recommendation server 112 executes: generating, using the recommendation algorithm, the set of recommended content items for the first user, a given item of the set of recommended content items not originating from the content channel; artificially inserting into the set of recommended items the digital content item; gathering an indication of user interactions of the first user with the set of recommended items, the user interactions indicative of the first user's propensity for the digital content item.

It should be noted that the steps 502 and 504 of the method 500 can be broadly categorized as a "content relevancy exploration phase". In other words, the steps 502 and 504 are the steps o the method 500 when the content exploration module 140 of the recommendation server 112 learns the relevancy parameter of the specialized digital content (as an example) using the pool of users 306.

In some non-limiting embodiments of the present technology, the content exploration module 140 of the recommendation server 112 can perform the content exploration phase off-line relative to actually providing the recommended digital content sets (such as, for example, during off peak hours and the like).

In some non-limiting embodiments of the present technology, the content exploration module 140 of the recommendation server 112 can perform the content exploration phase for each one of the content channels 301 in accordance to a pre-determined or a randomly generated schedule.

In other non-limiting embodiments of the present technology, the content exploration module 140 of the recommendation server 112 can perform the content exploration phase for a subset of the content channels 301, such as the top 10%, the top 20% or any other proportion of most popular ones of the content channels 301.

Step 506—predicting relevancy parameter of the digital content item for a user outside of the pool of users based on the user interactions of the first user At step 506, the recommended content selection module 117 predicts relevancy parameter of the digital content item for a user outside of the pool of users 306 based on the user interactions of the first user.

In other words, the step 506 can be thought of as an in-use phase of the method 500. Where the recommended content selection module 117 uses the "explored and predicted relevancy parameter" to predict relevancy of the associated digital content item to the general population of the user of the recommendation service of the recommendation system 100.

Optional/Alternative Implementations of the Method 500

In some embodiments of the method 500, the method 500 further comprises: in response to receiving a content recommendation requests from other client devices associated with other users that belong to the pool of users 306: generating, using the recommendation algorithm, a respective set of recommended items for the other users, a given item of the respective set of recommended items not originating from the content channel 301; artificially inserting into the respective set of recommended items the digital content item.

In some non-limiting embodiments of the present technology, the method 500 further comprises observing user interactions of the other users with the respective sets of content recommendations and generating an augmented relevancy parameter associated with the digital content item based on the user interactions of the other users with the respective sets of content recommendations. In some non-limiting embodiments of the present technology, the predicting relevancy parameter of the digital content item for the user outside of the pool of users 306 comprises: predicting the relevancy parameter based at least in part on the augmented relevancy parameter. In some non-limiting embodiments of the present technology, the augmented relevancy parameter is upwardly biased relative to a native relevancy parameter that would be generated by the recommendation algorithm.

Thus, as has been alluded to above, the exploration process can be repeated with various core users until sufficient prior user interaction information is obtained.

In some non-limiting embodiments of the present technology, the method 500 further comprises: in response to receiving a content recommendation request from a second client device associated with a second user that is outside the pool of users: generating, using the recommendation algorithm, the set of recommended items for the second user, the set of recommended items including the digital content item, inclusion of the digital content item into the set of recommended items being based on the relevancy parameter; gathering an indication of user interactions of the second user with the set of recommended items, the user interactions indicative of the second user's propensity for the digital content item.

In some non-limiting embodiments of the present technology, in response to the user interactions of the second user being indicative of lower propensity for the digital content item of the second user when compared to the first user: adjusting the relevancy parameter of the digital content item to a lower value thereof. This process has been described above as the "pessimization" process of the predicted relevancy parameter.

In some non-limiting embodiments of the present technology, the implicit association comprises the first user having been presented with a prior content item from the content channel and the first user not providing an indication of negative propensity in response thereto.

In some non-limiting embodiments of the present technology, the explicit association comprises at least one of: the first user subscribing to the content channel, the user liking a prior content item from the content channel, and the user commenting on the prior content item from the content channel.

In some non-limiting embodiments of the present technology, the given item of the set of recommended items is originating from a network resource accessible via the communication network (such as one of the first network resource 132, the second network resource 134 and the plurality of additional network resources 136).

In some non-limiting embodiments of the present technology, the given item of the set of recommended items is one of a news article, an image, a video, and an interactive snippet.

In some non-limiting embodiments of the present technology, all items of the set of recommended items are not originating from the content channel. In some non-limiting embodiments of the present technology, another given item of the set of recommended items is originating from a content channel being one of the content channel and another content channel. In some non-limiting embodiments of the present technology, the content channel is a native channel to the recommendation system. As such, even though embodiments of the present technology are particularly applicable to native content items, they are not so limited; and can be used for both native and non-native digital content items.

In some non-limiting embodiments of the present technology, the identifying the pool of users associated with the content channel comprises identifying the given user of the pool of users as being associated with the content channel based on at least one of: (i) an implicit association; and (ii) an explicit association.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of determining a relevancy parameter for a digital content item, the digital content item being originated from a content channel associated with a recommendation system, the relevancy parameter for ranking the digital content item as a recommended content item for users of the recommendation system, the recommendation system including a server and at least one client device connectable to the server via a communication network, the method executable by the server, the server further being configured to execute a recommendation algorithm to generate a set of recommended content items for a given user of the recommendation system;

the method comprising:
  identifying a pool of users associated with the content channel, a given user of the pool of users being associated with the content channel;
  in response to receiving a content recommendation request from a first client device associated with a first user that belongs to the pool of users:
    generating, using the recommendation algorithm, the set of recommended content items for the first user, a given item of the set of recommended content items not originating from the content channel;

artificially inserting into the set of recommended items the digital content item;

gathering an indication of user interactions of the first user with the set of recommended items, the user interactions indicative of the first user's propensity for the digital content item; and predicting relevancy parameter of the digital content item for a user outside of the pool of users based on the user interactions of the first user.

2. The method of claim 1, the method further comprises:

in response to receiving a content recommendation requests from other client devices associated with other users that belong to the pool of users:

generating, using the recommendation algorithm, a respective set of recommended items for the other users, a given item of the respective set of recommended items not originating from the content channel;

artificially inserting into the respective set of recommended items the digital content item.

3. The method of claim 2, further comprising observing user interactions of the other users with the respective sets of content recommendations and generating an augmented relevancy parameter associated with the digital content item based on the user interactions of the other users with the respective sets of content recommendations.

4. The method of claim 3, wherein the predicting relevancy parameter of the digital content item for the user outside of the pool of users comprises:

predicting the relevancy parameter based at least in part on the augmented relevancy parameter.

5. The method of claim 4, wherein the augmented relevancy parameter is upwardly biased relative to a native relevancy parameter that would be generated by the recommendation algorithm.

6. The method of claim 1, wherein the method further comprises:

in response to receiving a content recommendation request from a second client device associated with a second user that is outside the pool of users:

generating, using the recommendation algorithm, the set of recommended items for the second user, the set of recommended items including the digital content item, inclusion of the digital content item into the set of recommended items being based on the relevancy parameter;

gathering an indication of user interactions of the second user with the set of recommended items, the user interactions indicative of the second user's propensity for the digital content item.

7. The method of claim 6, wherein in response to the user interactions of the second user being indicative of lower propensity for the digital content item of the second user when compared to the first user:

adjusting the relevancy parameter of the digital content item to a lower value thereof.

8. The method of claim 1, wherein the artificially inserting the digital content item into the set of recommended items comprises:

ranking the digital content item relative to other content items within the set of recommended items, the ranking being based on the predicted relevancy parameter of the digital content item.

9. The method of claim 1, wherein the artificially inserting the digital content item into the set of recommended items comprises:

positioning the digital content item relative to other content items within the set of recommended items at a pre-determined position within the set of recommended items.

10. The method of claim 9, wherein the pre-determined position is selected such that to maximize a probability of the user interaction with the digital content item.

11. The method of claim 1, wherein the identifying the pool of users associated with the content channel comprises identifying the given user of the pool of users as being associated with the content channel based on at least one of: (i) an implicit association;

and (ii) an explicit association.

12. The method of claim 11, wherein the implicit association comprises the first user having been presented with a prior content item from the content channel and the first user not providing an indication of negative propensity in response thereto.

13. The method of claim 11, wherein the explicit association comprises at least one of: the first user subscribing to the content channel, the user liking a prior content item from the content channel, and the user commenting on the prior content item from the content channel.

14. The method of claim 13, wherein the given item of the set of recommended items is one of a news article, an image, a video, and an interactive snippet.

15. The method of claim 1, wherein the given item of the set of recommended items is originating from a network resource accessible via the communication network.

16. The method of claim 1, wherein all items of the set of recommended items are not originating from the content channel.

17. The method of claim 1, another given item of the set of recommended items is originating from a content channel being one of the content channel and another content channel.

18. The method of claim 1, wherein the content channel is a native channel to the recommendation system.

19. A recommendation server for generating a digital content recommendation, the digital content recommendation for displaying on an electronic device associated with a user, the server connectable to the electronic device via a communication network, the recommendation server executing a ranking algorithm, the recommendation server comprising a processor configured to determine a relevancy parameter for a content item, the digital content item being originated from a content channel associated with the recommendation server, the relevancy parameter for ranking the digital content item as a recommended content item for users of the recommendation server, the recommendation server including a server and at least one client device connectable to the server via a communication network, the method executable by the recommendation server, the processor of the recommendation server further being configured to execute a recommendation algorithm to generate a set of recommended content items for a given user of the recommendation server;

the processor being further configured to:

identify a pool of users associated with the content channel, a given user of the pool of users being associated with the content channel;

in response to receiving a content recommendation request from a first client device associated with a first user that belongs to the pool of users:
  generate, using the recommendation algorithm, the set of recommended content items for the first user, a given item of the set of recommended content items not originating from the content channel;
  artificially insert into the set of recommended items the digital content item;
gather an indication of user interactions of the first user with the set of recommended items, the user interactions indicative of the first user's propensity for the digital content item; and
predict a relevancy parameter of the digital content item for a user outside of the pool of users based on the user interactions of the first user.

* * * * *